(12) United States Patent
Bilsen et al.

(10) Patent No.: US 8,678,941 B2
(45) Date of Patent: Mar. 25, 2014

(54) RAPIDLY DEPLOYABLE PRIMARY STAGE UNIT

(75) Inventors: Tom Bilsen, Rotselaar (BE); Johan Troukens, Aarschot (BE)

(73) Assignee: Hitech Stages, Ltd., West Vancouver, BC (CA)

( * ) Notice: Subject to any disclaimer, the term of this patent is extended or adjusted under 35 U.S.C. 154(b) by 208 days.

(21) Appl. No.: 13/097,814

(22) Filed: Apr. 29, 2011

(65) Prior Publication Data

US 2012/0277010 A1    Nov. 1, 2012

(51) Int. Cl.
*A63J 1/02*    (2006.01)
*A63G 27/00*    (2006.01)

(52) U.S. Cl.
USPC .................................. 472/75; 472/3; 446/427

(58) Field of Classification Search
USPC .................. 472/3, 75–76; 446/424–428, 454; 414/458, 459, 540, 545, 347, 392
See application file for complete search history.

(56) References Cited

U.S. PATENT DOCUMENTS

| | | | |
|---|---|---|---|
| 3,541,598 A * | 11/1970 | Dousset Remy | 414/459 |
| 4,026,076 A | 5/1977 | Analetto | |
| 4,232,488 A | 11/1980 | Hanley | |
| 5,078,442 A | 1/1992 | Rau et al. | |
| 5,152,109 A | 10/1992 | Boers | |
| 5,280,985 A | 1/1994 | Morris | |
| 5,327,698 A | 7/1994 | Uhl | |
| 5,400,551 A | 3/1995 | Uhl | |
| 5,642,589 A | 7/1997 | Miron et al. | |
| 5,651,405 A | 7/1997 | Boeddeker et al. | |
| 5,716,090 A | 2/1998 | Chang et al. | |
| 5,800,114 A * | 9/1998 | Secondi | 414/458 |
| 5,947,502 A | 9/1999 | Kammerzell et al. | |
| 6,155,770 A * | 12/2000 | Warhurst | 414/498 |
| 6,176,495 B1 | 1/2001 | Decker | |
| 6,393,769 B1 | 5/2002 | Mertik et al. | |
| 6,499,258 B1 | 12/2002 | Borglum | |
| 7,811,044 B2 * | 10/2010 | Warhurst | 414/458 |
| 2010/0024314 A1 | 2/2010 | Pope | |
| 2010/0320708 A1 | 12/2010 | Pope | |

FOREIGN PATENT DOCUMENTS

| | | |
|---|---|---|
| EP | 2277739 | 1/2011 |
| GB | 2223417 | 4/1990 |
| WO | WO-03/046315 A1 | 6/2006 |
| WO | WO2006070094 | 7/2006 |

OTHER PUBLICATIONS

International Searching Authority, International Search Report and Written Opinion for PCT/IB2011/001345, issued Dec. 2011.

* cited by examiner

*Primary Examiner* — Kien Nguyen
(74) *Attorney, Agent, or Firm* — Faegre Baker Daniels LLP

(57) ABSTRACT

The present disclosure provides a primary stage unit configured for transport on a standard semi-truck trailer including a plurality of lateral supports that engage the ground and lift the primary stage unit off of the trailer, a pair of wheel units that engage the ground and move the primary stage unit to a desired location, a main stage floor that pivots from a substantially vertical stowed position to a substantially horizontal in-use position and moves vertically to a desired height, a roof assembly including a pair of support columns that extend telescopically from a stowed position to an in-use position, and a plurality of roof joists supporting a corresponding plurality of roof panels.

42 Claims, 24 Drawing Sheets

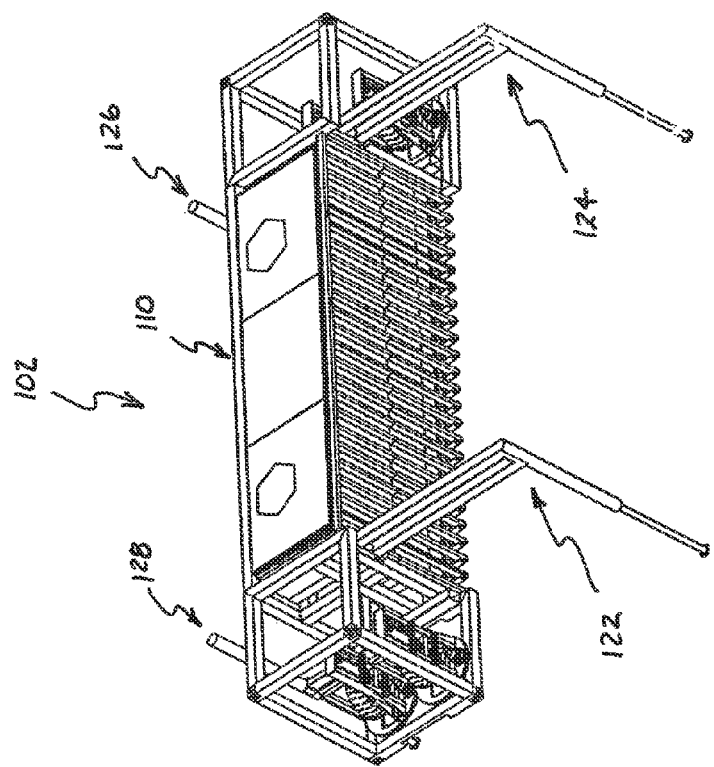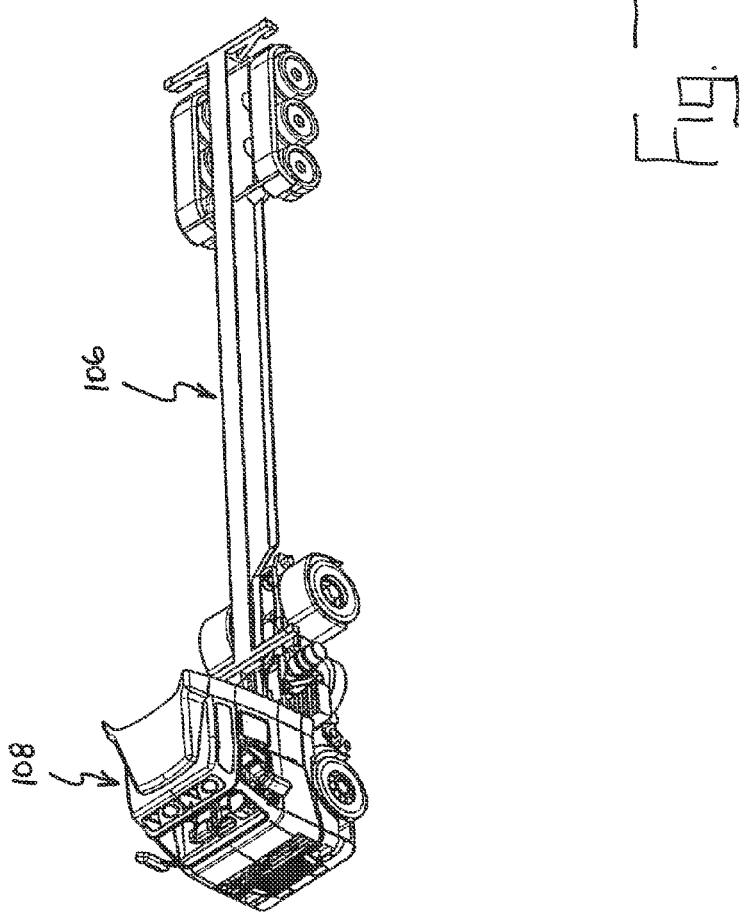
Fig. 7

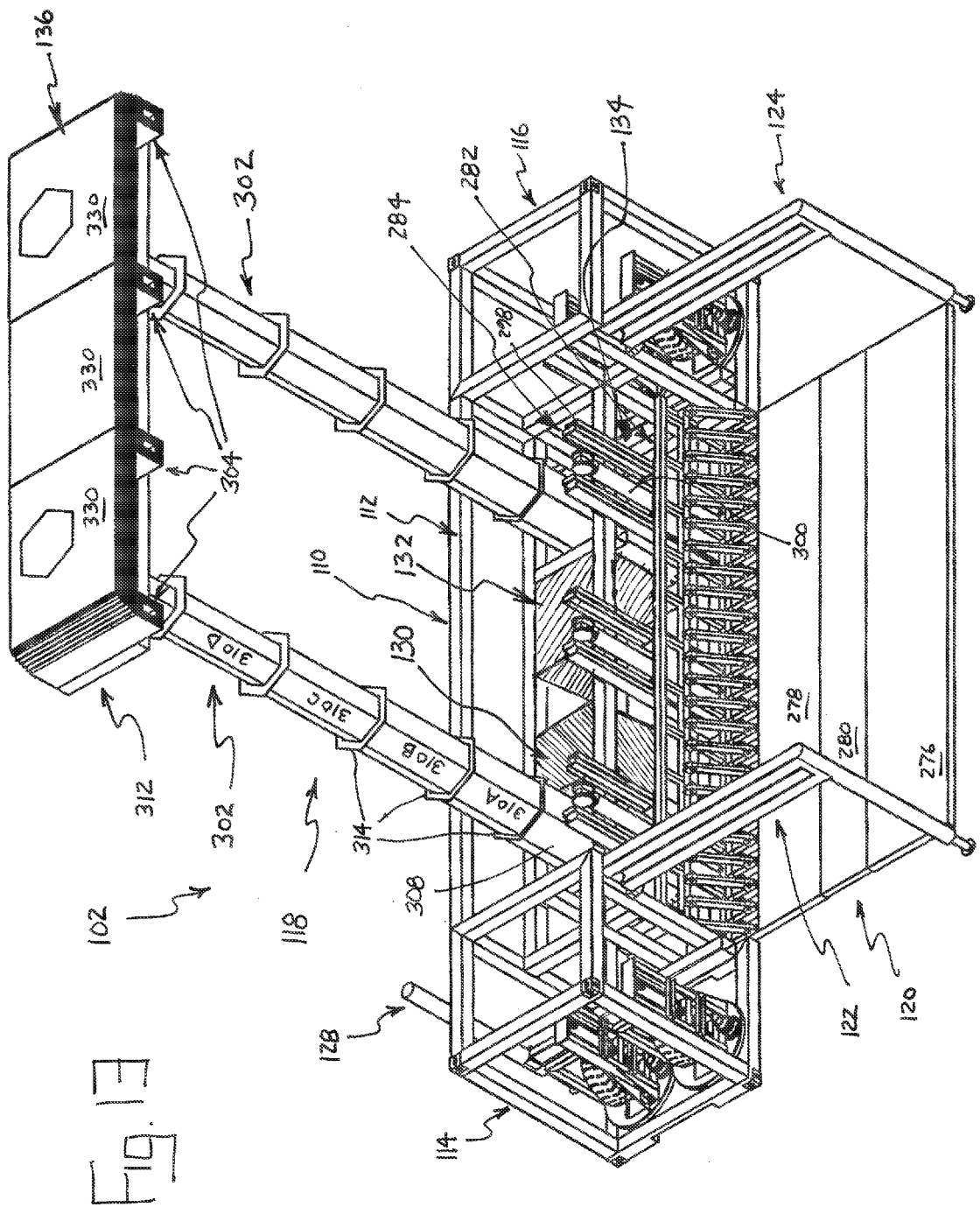

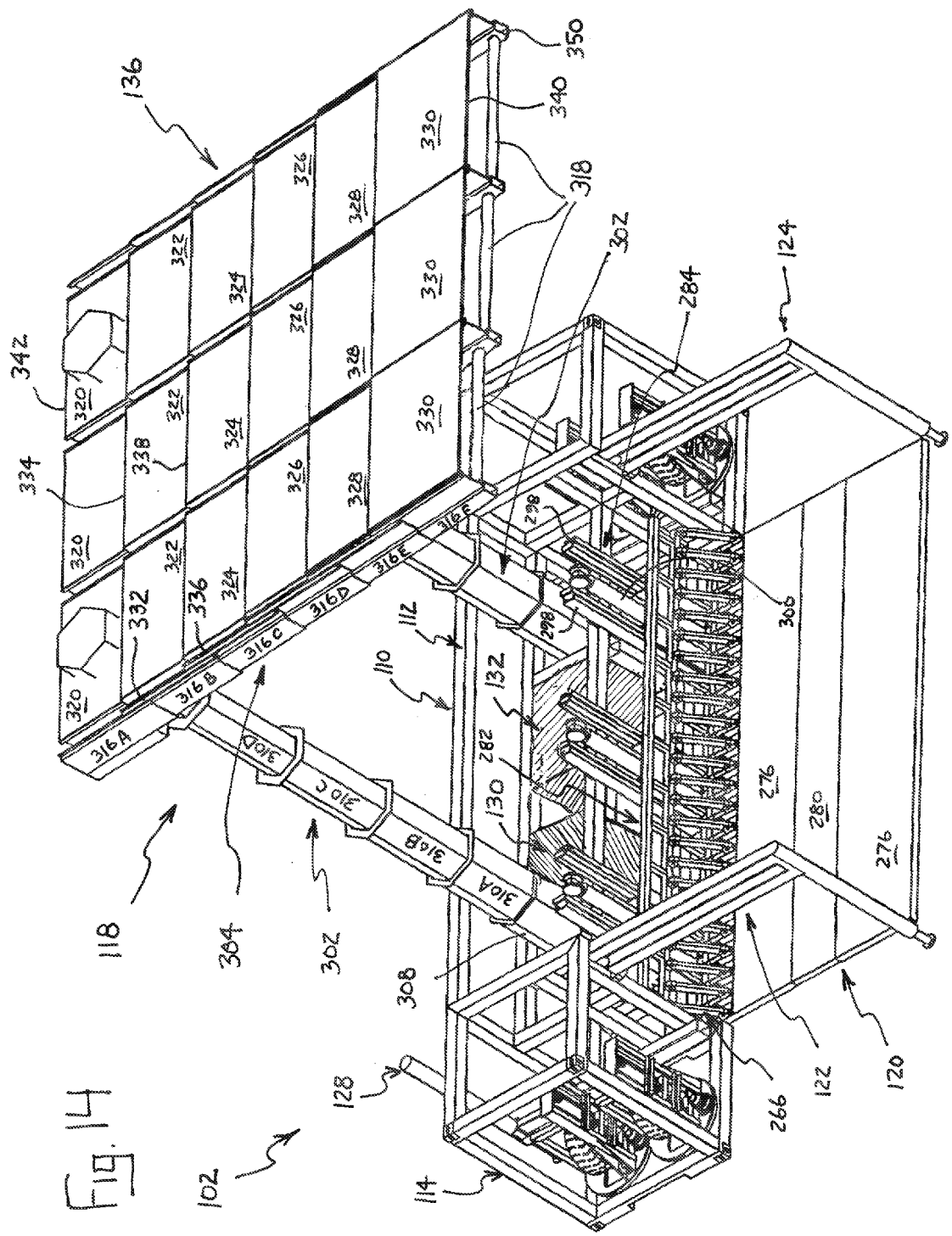

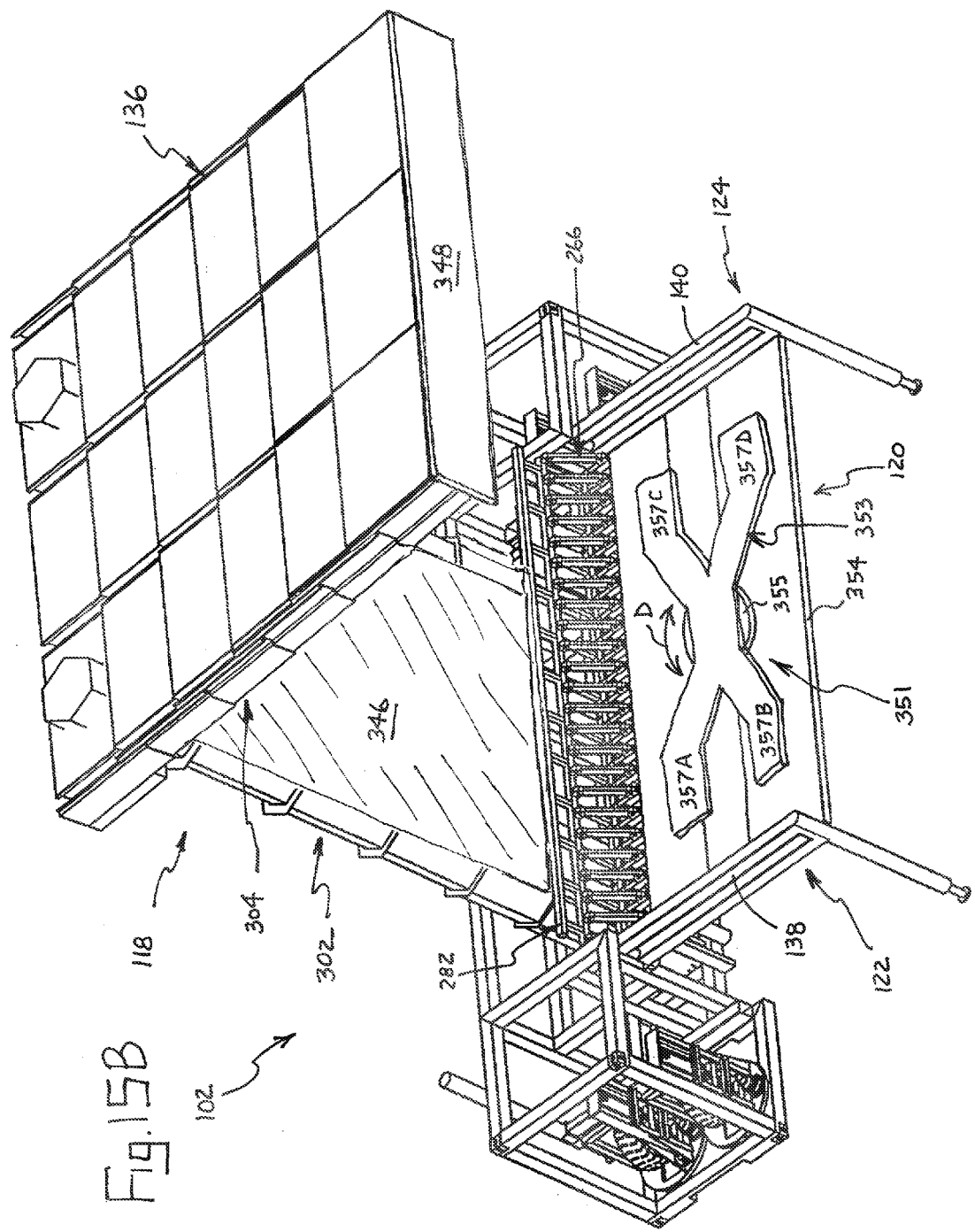

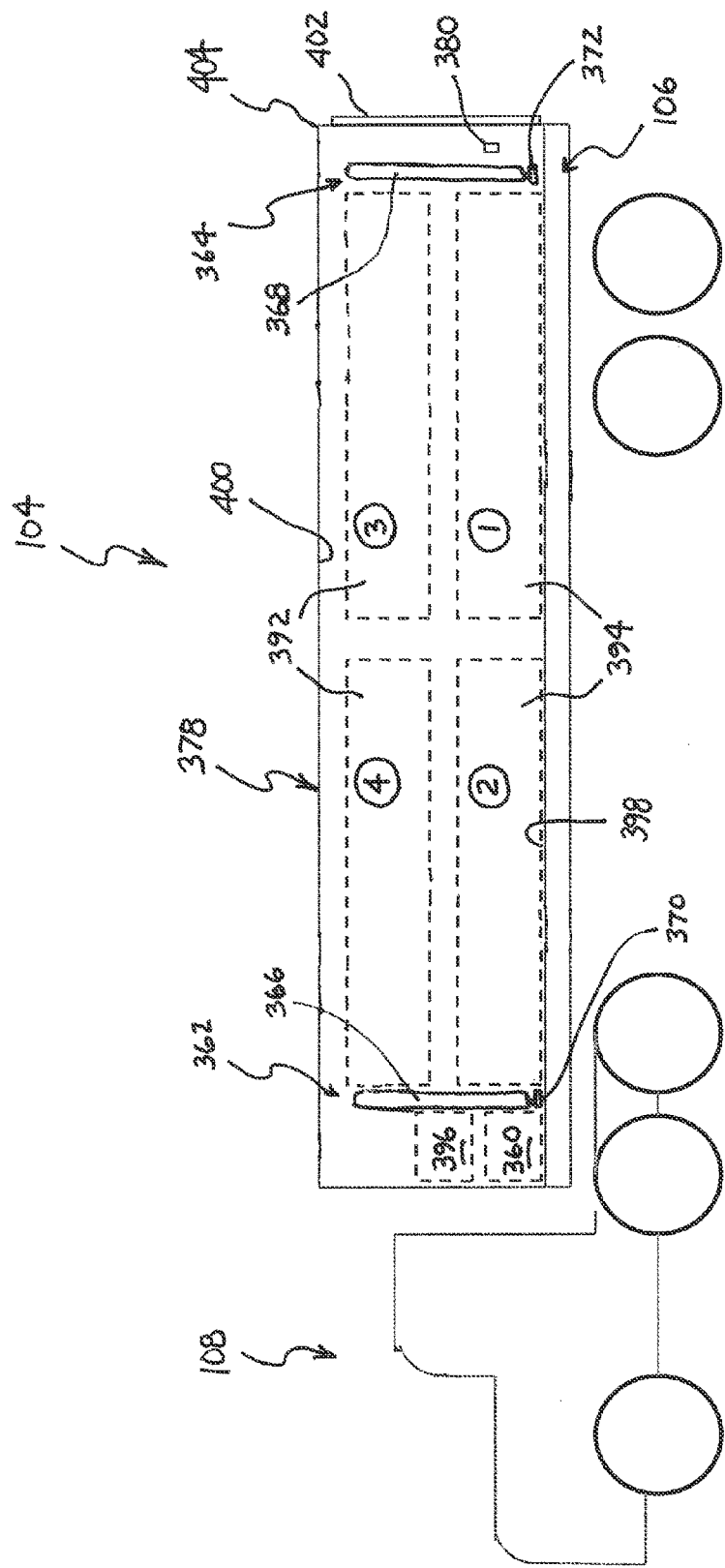

RAPIDLY DEPLOYABLE PRIMARY STAGE UNIT

RELATED APPLICATIONS

This application is related to the subject matter of co-filed patent applications entitled RAPIDLY DEPLOYABLE STAGE SYSTEM, docket HTS-P0001, and RAPIDLY DEPLOYABLE BUGGIES FOR A STAGE SYSTEM, docket HTS-P0003, the entire disclosures of which are hereby expressly incorporated herein by reference.

FIELD OF THE DISCLOSURE

The present disclosure relates to stage systems that can be moved from one location to another, and more particularly to a primary stage unit for a rapidly deployable, fully integrated staging system that provides a high-end, professional performance environment at substantially reduced costs compared to conventional systems.

BACKGROUND OF THE DISCLOSURE

Many events such as concerts, speaking engagements, product promotions, fashions shows and the like (collectively, "performance events") are provided at a variety of different locations over the course of a "tour," but occur only once at any particular location and last for just a few hours. Often, the venues for the performance events do not provide the equipment necessary for the event (i.e., the stages, lighting and audio/video equipment—collectively, "performance equipment"), particularly if the venue is outside. Accordingly, the performance equipment must be moved to each venue. Large-scale performance events such as stadium concerts typically utilize custom built performance equipment that requires days or even weeks to assemble, configure and tear down. The expense associated with the very high costs of assembling, disassembling and transporting such performance equipment is generally justified by the revenue generated by the large crowds in attendance, and often further offset by providing multiple performances on different dates at the same venue.

At the other end of the spectrum, many small-scale performance events such as rallies by local politicians require the use of inexpensive performance equipment. Such equipment may include a towable trailer with a fold-out side wall forming a stage and a roof to protect against the elements. The low-impact, unprofessional environment provided by these systems is acceptable given the nature of the performance event and high portability and low cost of the system.

A very large portion of performance events fall in the middle. Elaborate, custom-built performance equipment is impractical and the amateur environment provided by low-end systems is unacceptable to the performers and/or promoters of the event. Solutions for this market also exist. Generally, mid-market performance equipment solutions include higher-end convertible trailer systems and container systems. The convertible trailer systems typically provide a low-impact, "back of a trailer" environment that is unsuitable for many performance events. Moreover, these systems generally must be augmented with external power sources, audio equipment, and video equipment. This requires substantial set-up and tear-down time and logistics challenges in making sure the equipment is delivered and removed according to the performance schedule. Often, several hours are required before and after the performance. Typical container systems include stand-alone stages that are unloaded from a semi-trailer. While these systems may avoid the "back of a trailer" look and feel, they typically also require substantial set-up and tear-down time and auxiliary power, audio, and video equipment. Additionally, cranes, forklifts and other equipment are typically necessary to unload and configure the components of such systems, adding to the cost of the systems and complicating the scheduling for setup and tear-down.

The logistics and deployment time associated with these conventional mid-market staging solutions essentially preclude their use for a tour including back-to-back performances at different venues. In many cases it is simply not possible tear-down the performance equipment after a performance, transport it to the next venue, and setup the equipment in time for a performance the next evening. Accordingly, some promoters rent two or even three duplicate performance equipment systems to accommodate the schedule of the tour. Of course, this added cost significantly impacts the overall profitability of the tour.

SUMMARY OF THE DISCLOSURE

The present disclosure describes a primary stage unit for a rapidly deployable, fully integrated staging system that provides a high-end, professional performance environment at substantially reduced costs compared to conventional systems.

One embodiment of the present disclosure provides a primary stage unit configured for transport on a standard semi-truck trailer including a plurality of lateral supports that are controllable by remote control to engage the ground and lift the primary stage unit off of the trailer, a pair of wheel units that are controllable by remote control to engage the ground and move the primary stage unit to a desired location, a main stage floor that is controllable by remote control to pivot from a substantially vertical stowed position to a substantially horizontal in-use position and to move vertically to a desired height, a roof assembly including a pair of support columns that are controllable by remote control to extend telescopically from a stowed position to an in-use position, and a plurality of roof joists supporting a corresponding plurality of roof panels, the roof joists being controllable by remote control to move between a retracted position and an extended position, wherein the roof panels are supported above the main stage floor.

In another embodiment, the present disclosure provides a rapidly deployable primary stage unit configured for transport on a standard semi-trailer, including a remote control including a plurality of buttons, a generator, a control system powered by the generator, a plurality of lateral supports coupled to the control system, and a pair of steerable wheel units coupled to the control system. In this embodiment, actuation of the plurality of buttons causes activation of the generator, movement of the plurality of lateral supports which lifts the primary stage unit off of the trailer, deployment of the wheel units, and enables an operator to steer the primary stage unit to a desired location.

In yet another embodiment, the present disclosure provides a method for rapidly deploying a primary stage unit, including the steps of using a remote control to deploy lateral supports of the primary stage unit to engage the ground and lift the primary stage unit off of a trailer, using the remote control to deploy and control wheel units mounted to the primary stage unit to move the primary stage unit to a desired location, using the remote control to deploy a main stage of the primary stage unit into an in-use position by pivoting and raising the main stage, and using the remote control to deploy a roof assembly of the primary stage unit into an in-use position by moving a plurality of roof panels vertically relative to the main stage and telescopically extending the roof panels substantially horizontally relative to the main stage.

In still another embodiment, the present disclosure provides a rapidly deployable primary stage unit configured for transport on a standard semi-truck trailer, including a telescopically movable roof assembly, a pivoting main stage, a pair of retractable, steerable wheel units, and movable lateral supports having ground-engaging legs. In this embodiment, the primary stage unit is configured to respond to signals from a remote control by executing a deployment sequence, including actuating the lateral supports to engage the ground, thereby lifting the primary stage unit off of the trailer, extending the wheel units, actuating the lateral supports to lower the primary stage unit onto the wheel units, steering the primary stage unit to a desired location, pivoting the main stage into a substantially horizontal position, and telescopically raising and extending the roof assembly to provide protection for the main stage.

BRIEF DESCRIPTION OF THE DRAWINGS

The above-mentioned aspects of the present teachings and the manner of obtaining them will become more apparent and the teachings will be better understood by reference to the following description of the embodiments taken in conjunction with the accompanying drawings, wherein:

FIGS. 4 through 10 are perspective views of various steps included in an automatic unloading sequence of a primary stage unit according to the present disclosure;

FIGS. 11 through 15B are perspective views of the deployment of a main stage and roof assembly of a primary stage unit according to the present disclosure;

FIG. 16 us a side conceptual view of a secondary stage unit mounted to a trailer of a semi-truck;

Corresponding reference characters indicate corresponding parts throughout the several views.

DETAILED DESCRIPTION OF EMBODIMENTS OF THE DISCLOSURE

The embodiments of the present teachings described below are not intended to be exhaustive or to limit the teachings to the precise forms disclosed in the following detailed description. Rather, the embodiments are chosen and described so that others skilled in the art may appreciate and understand the principles and practices of the present teachings.

Figure 1:
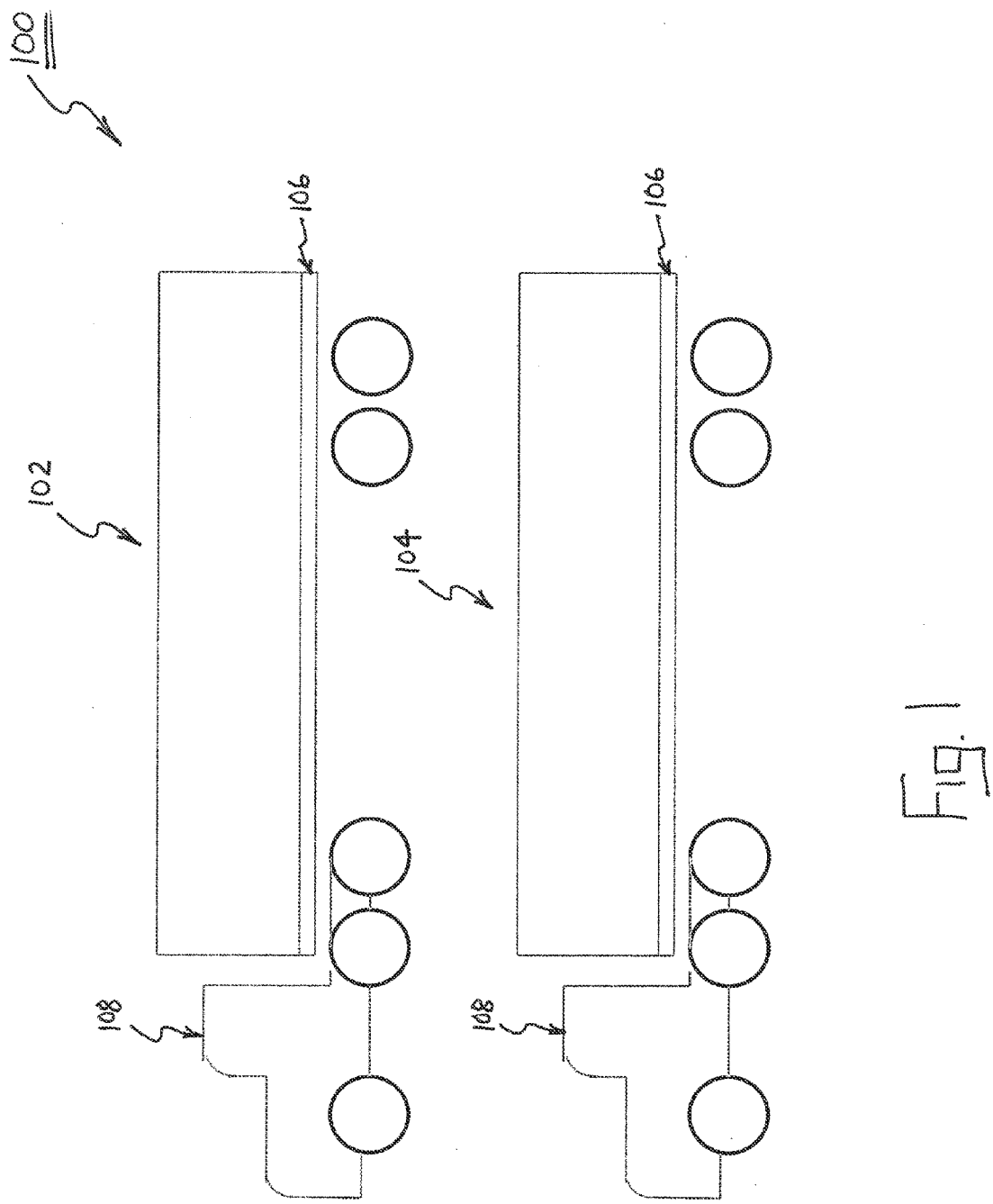
FIG. 1 is side conceptual view of the system of the present disclosure mounted to the trailers of two semi-trucks.

As shown generally in FIG. 1, system 100 includes a primary stage unit 102 and a secondary stage unit 104. Both units are moved from venue to venue on trailers 106 of standard semi-trucks 108. As is described in detail below, the contents of stage units 102, 104 are unloadable without use of moving equipment such as cranes or forklifts, and are movable into their desired locations using remote controls. Additionally, the contents include all of the lighting and audio/video equipment necessary to provide a high-end, high-impact, professional environment for a performance event. In one embodiment, all of these components may be automatically unloaded from trailers 106 and configured into a performance ready condition in less than one hour.

Figure 2:
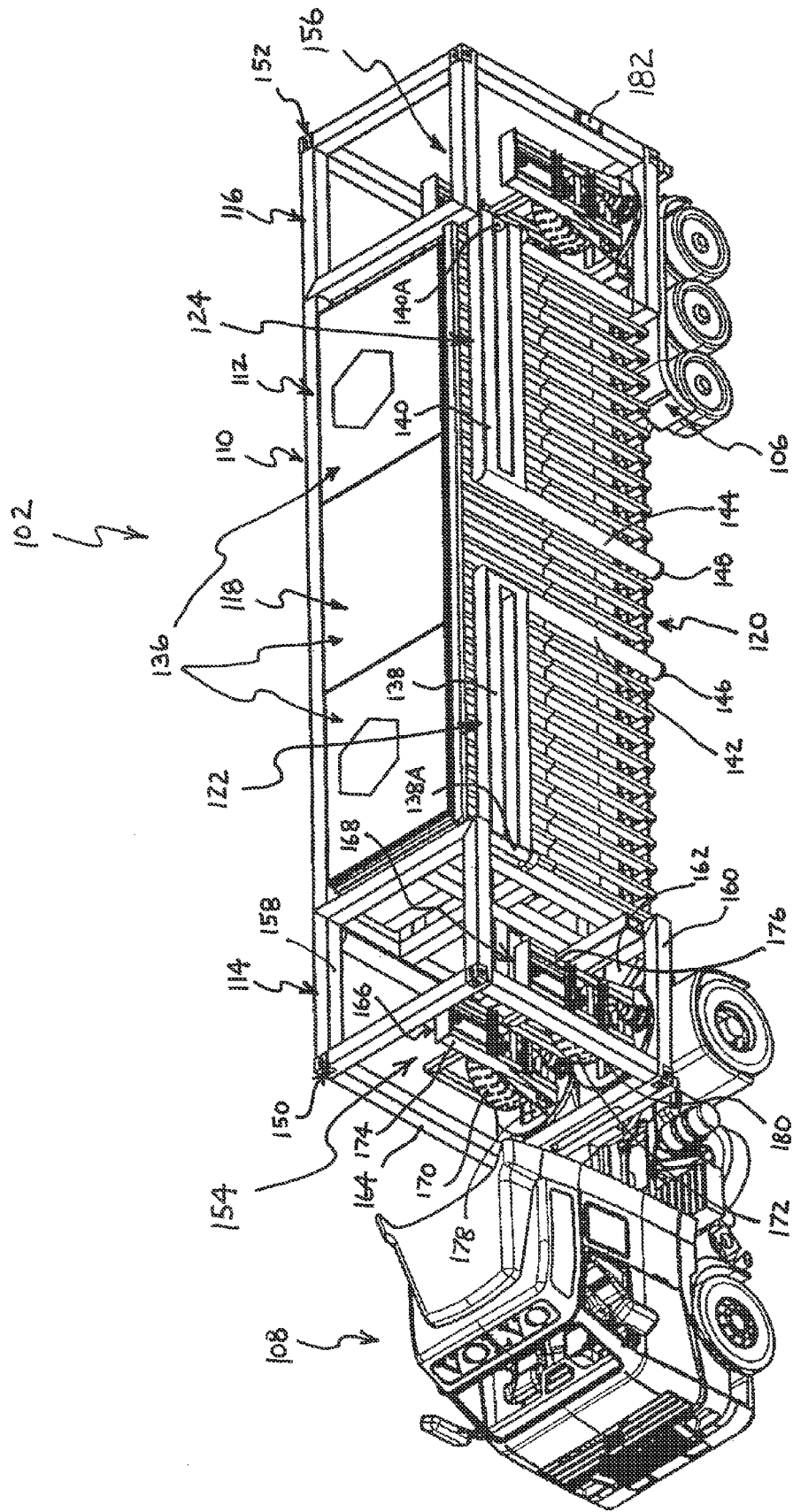
FIG. 2 is a perspective view of a primary stage unit according to the present disclosure while loaded on a semi-truck trailer.

Referring now to FIG. 2, primary stage unit 102 occupies the volume envelop of a standard semi-truck container. Primary stage unit 102 is transported from venue to venue by standard semi-truck 108 on flat-bed trailer 106. Primary stage unit 102 as depicted in FIG. 2 generally includes a main frame 110 including a central enclosure 112 and a pair of wheel housings 114, 116. Central enclosure 112 generally includes a roof assembly 118, a main stage floor 120, a pair of front lateral stage supports 122, 124, and a pair of rear lateral stage supports 126, 128 (shown in FIG. 5). As is further described below, central enclosure 112 also includes a generator 130 (FIG. 13), a hydraulic control system 132 including a hydraulic power pack (FIG. 13), a lift mechanism 134 (FIG. 12), and electronic components required for remotely controlling the movement of primary stage unit 102 and integrating the lighting, audio and video components of primary stage unit 102 with the rest of system 100.

Roof assembly 118 includes a plurality of roof panels 136 which are remotely deployed to provide protection against elements such as rain during the performance event. Roof assembly 118 includes a plurality of additional components that will be described in the context of the description of deployment of system 100 provided below. Similarly, the various elements of main stage floor 120 will be described in greater detail below. Each of front lateral stage supports 122, 124 generally include a horizontal support 138, 140 attached at one end 138A, 140A in a pivotal fashion to a wheel housing 114, 116 and supporting a vertical support 142, 144 at the other end 138B, 140B, which houses a telescopically movable ground-engaging leg 146, 148.

Wheel housings 114, 116 generally form a box-like support structure 150, 152 for a pair of wheel units 154, 156, which may be manufactured by Kamag. As wheel housings 114, 116 are substantially identical, only wheel housing 114 is described in detail herein. Support structure 150 includes an upper truss 158, a lower truss 160 forming a floor 162, and a plurality of uprights 164 connecting upper truss 158 to lower truss 160. Wheel unit 154 is mounted in a rotatable fashion to lower truss 160, and includes a pair of wheel supports 166, 168, each supporting a wheel 170, 172. Each wheel support 166, 168 includes a vertical drive unit 174, 176 which may be actuated remotely to raise and lower the corresponding wheel 170, 172 relative to an opening 178, 180 formed through floor 162 below the wheel 170, 172. As is further described below, wheel unit 154 may be operated to lower wheels 170, 172 through openings 178, 180 to engage the ground and move primary stage unit 102 to a desired location. Because wheel units 154, 156 are rotatable independently of one another and provide 360 degree steering, they may cause primary stage unit 102 to perform tight direction changes with a minimum of damage to the ground over which primary stage unit 102 travels. This is a significant advantage when system 100 is deployed at venues such as fields of sporting events, on fairgrounds, and in other locations where the integrity of the surface must be maintained. Moreover, the maneuverability of primary stage unit 102 as a result of the rotatable independence of wheel units 154, 156 permits positioning of primary stage unit 102 in locations that would be otherwise inaccessible by conventional trailer systems or present difficult positioning challenges for conventional container systems.

The sequence of figures including FIGS. 4-15 are provided to explain a typical deployment process for primary stage unit 102. The various components of primary stage unit 102 will be described in greater detail in the context of this deployment process. Semi-truck 108 is used to move primary stage unit 102 to the venue. Semi-truck 108 need only be driven to a location near the final location of primary stage unit 102 as primary stage unit 102 may be positioned by remote control in the manner described below. As a consequence of the self-unloading, remote control and self-powered functionality of primary stage unit 102, semi-truck 108 may not need to be driven off-road, onto delicate surfaces such as grass or artificial turf. Moreover, auxiliary equipment such as cranes or forklifts is also unnecessary to position primary stage unit 102. This prevents the surface damage that may otherwise result, reduces the logistics challenges for the event promoter in scheduling the arrival of such equipment, and eliminates the extra costs associated with renting the equipment.

Figure 3:
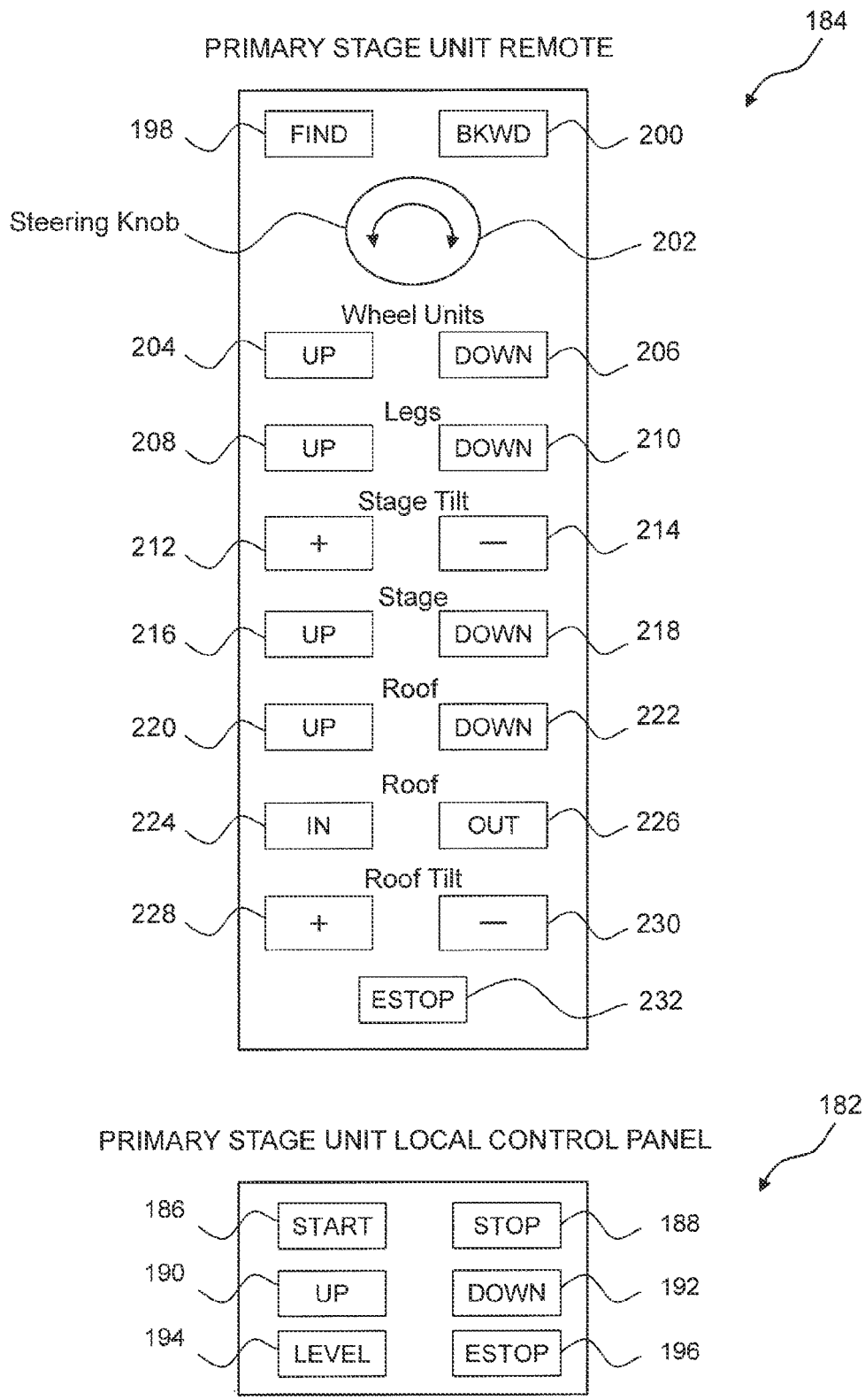
FIG. 3 is a conceptual view of a primary stage unit remote control and a primary stage unit local control panel.

When semi-truck 108 is driven to the desired location and parked, primary stage unit 102 may be activated and controlled using a local control panel 182 and a remote control 184 as shown in FIG. 3. Each of local control panel 182 and remote control 184 include a transmitter (not shown) configured to transmit signals to a receiver/controller (not shown) mounted to primary stage unit 102 using conventional remote control technology such as infrared or radio frequency transmission. Local control panel 182 is mounted to primary stage unit 102 in a convenient, accessible location such as shown in FIG. 2. Local control panel 182 includes a start button 186, a stop button 188, a legs up button 190, a legs down button 192, a level button 194, and an emergency stop button 196. Remote control 184 includes a stage unit forward button 198, a stage unit reverse button 200, a steering knob 202, a wheel unit up button 204, a wheel unit down button 206, a legs up button 208, a legs down button 210, a stage tilt (+) button 212, a stage tilt (−) button 214, a stage up button 216, a stage down button 218, a roof up button 220, a roof down button 222, a roof in button 224, a roof out button 226, a roof tilt (+) button 228, a roof tilt (−) button 230, and an emergency stop button 232. It should be understood that the manual inputs depicted for local control panel 182 and remote control 184 may include any of a variety of different control mechanisms such as toggle switches, joysticks, touch screens, sliders, and other suitable mechanisms. The functions of the depicted buttons may also be combined. For example, forward button 198 and backward button 200 may be combined into a single, two-position switch which indicates a desire to move in a forward direction when in one position and a desire to move in a reverse direction when in the other position.

Figure 4:
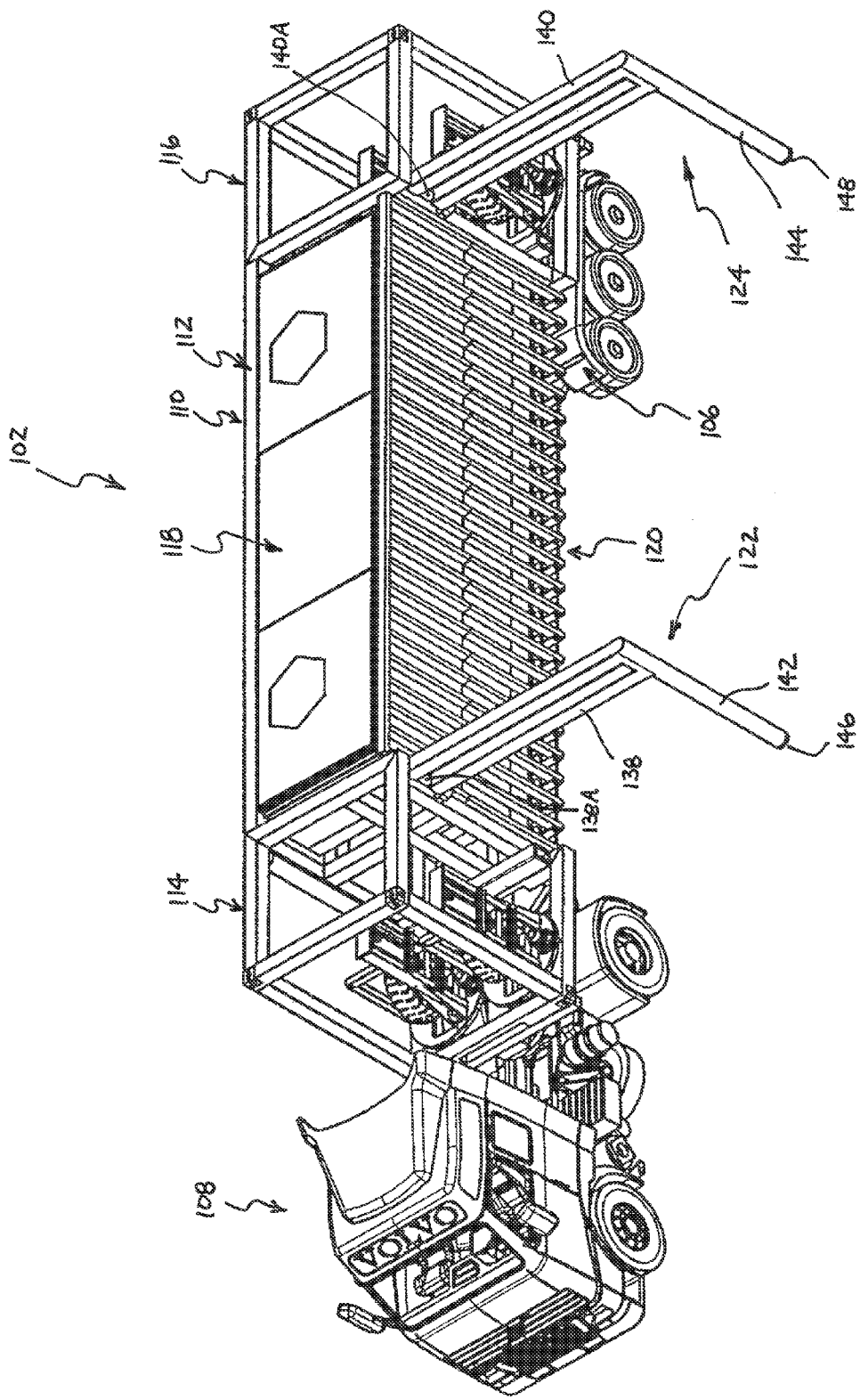
Figure 5:
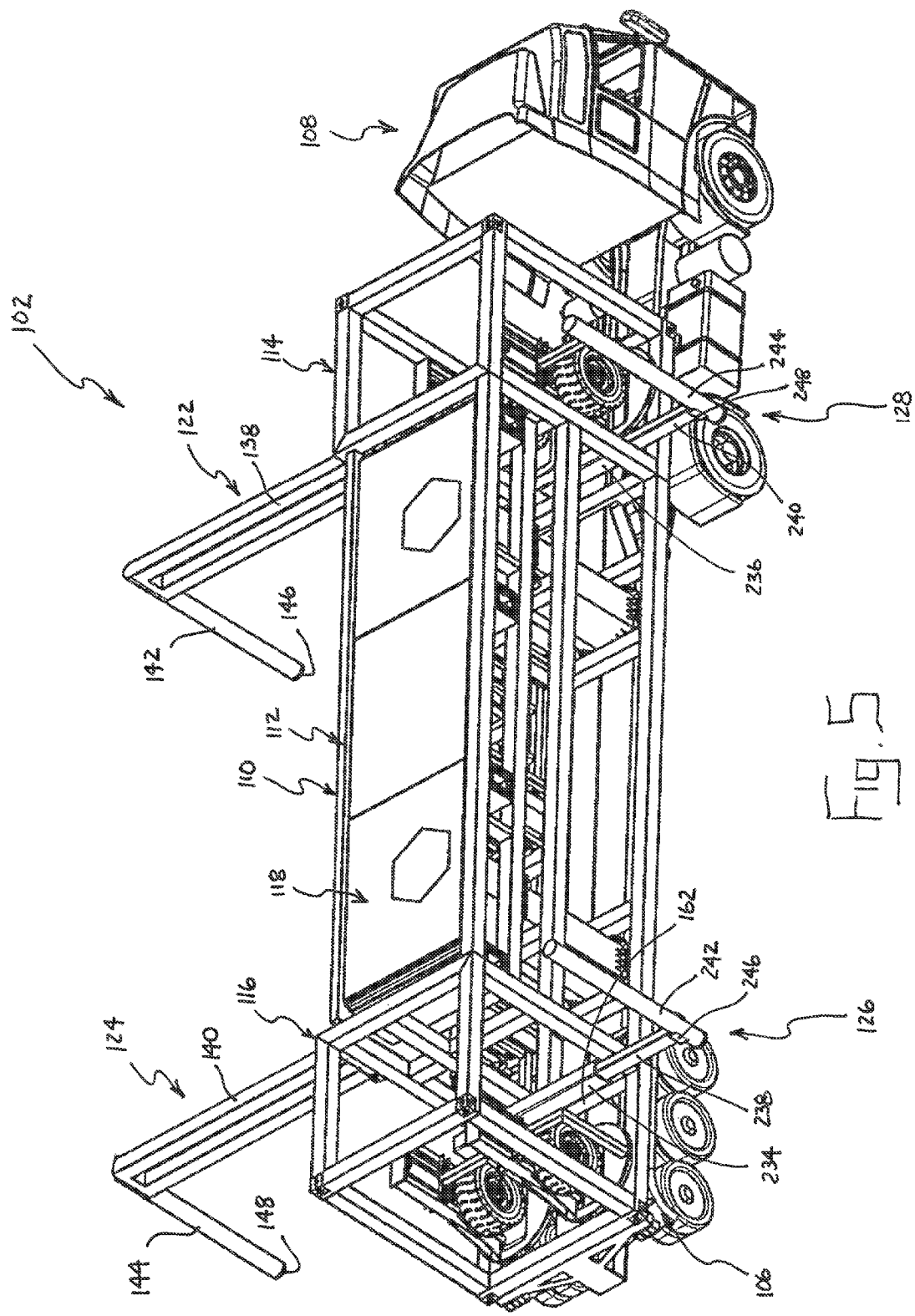
Figure 5:
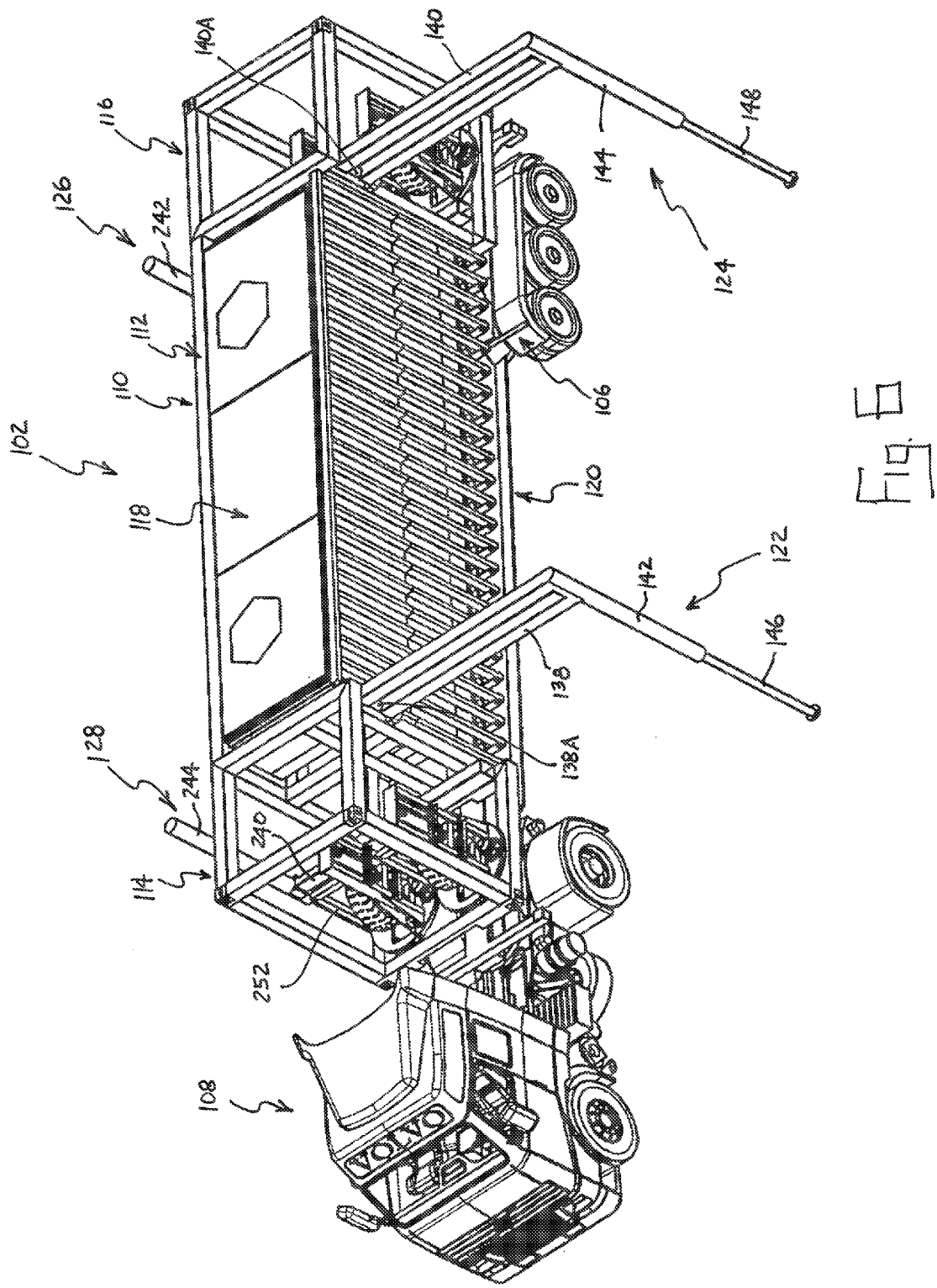

Returning now to the deployment process of FIGS. 4-15, the operator first actuates start button 186 of local control panel 182 to activate generator 130 (FIG. 13) located in central enclosure 112 of primary stage unit 102. Generator 130 then powers hydraulic control system 132 including a hydraulic power pack (FIG. 13), which powers front lateral stage supports 122, 124. The operator then actuates legs down button 192 (or button 210 of remote control 184) which, as shown in FIG. 4, causes front stage supports 122, 124 to pivot outwardly from main frame 110 to a perpendicular, support position. As shown in FIG. 5, rear stage supports 126, 128 are also moved into their support position. Each rear stage support includes a support housing 234, 236 mounted to wheel housing floor 162, a telescopically movable lateral arm 238, 240, and a vertical support 242, 244 connected to the end 246, 248 of lateral arm 238, 240. To move to the support position shown in FIG. 5, lateral arms 238, 240 of rear stage supports 126, 128 move telescopically out of their storage/transport positions within support housings 234, 236.

Next, as shown in FIG. 6, ground-engaging legs 146, 148, 250, 252 of front lateral stage supports 122, 124 and rear lateral stage supports 126, 128 move hydraulically and telescopically from vertical supports 142, 144, 242, 244 downwardly to engage the ground and lift primary stage unit 102 off of flat-bed trailer 106. In this manner, primary stage unit 102 is self-unloading without the need for cranes or other heavy equipment and the associated logistics challenges and costs.

Figure 8:
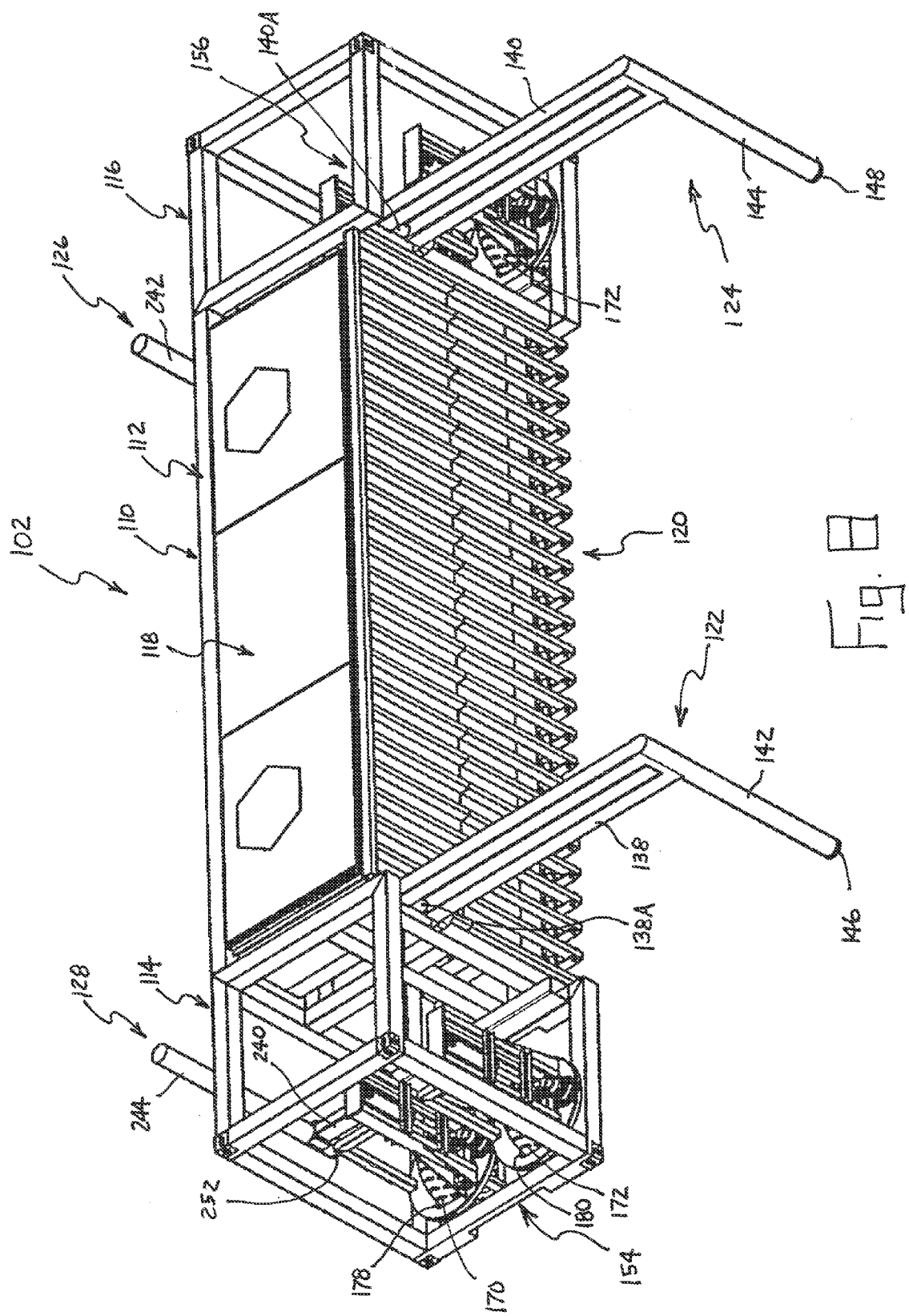

FIG. 7 shows primary stage unit 102 supported entirely by front and rear lateral stage supports 122, 124, 126, 128 such that semi-truck 108 and flat bed trailer 106 may be driven away from primary stage unit 102. As shown in FIG. 8, after semi-truck 108 is driven away from primary stage unit 102, the operator actuates wheel units down button 206 of remote control 184 which causes wheel units 154, 156 to lower wheels 170, 172 through openings 178, 180 toward the ground. The operator then actuates legs up button 208 of remote control 184 which causes ground-engaging legs 146, 148, 250, 252 of front and rear stage supports 122, 124, 126, 128 to retract into vertical supports 142, 144, 242, 244, thereby lowering primary stage unit 102 toward the ground. In this manner, the weight carried by stage supports 122, 124, 126, 128 is transferred to wheels 170, 172. Legs up button 208 also causes lateral stage supports 122, 124 to pivot back into the position shown in FIG. 2, and rear lateral stage supports 126, 128 to withdraw into their refracted position. Consequently, primary stage unit 102 is left fully unloaded and positioned on its wheels 170, 172 in its proximate location on the ground of the venue as shown in FIG. 9.

Figure 9:
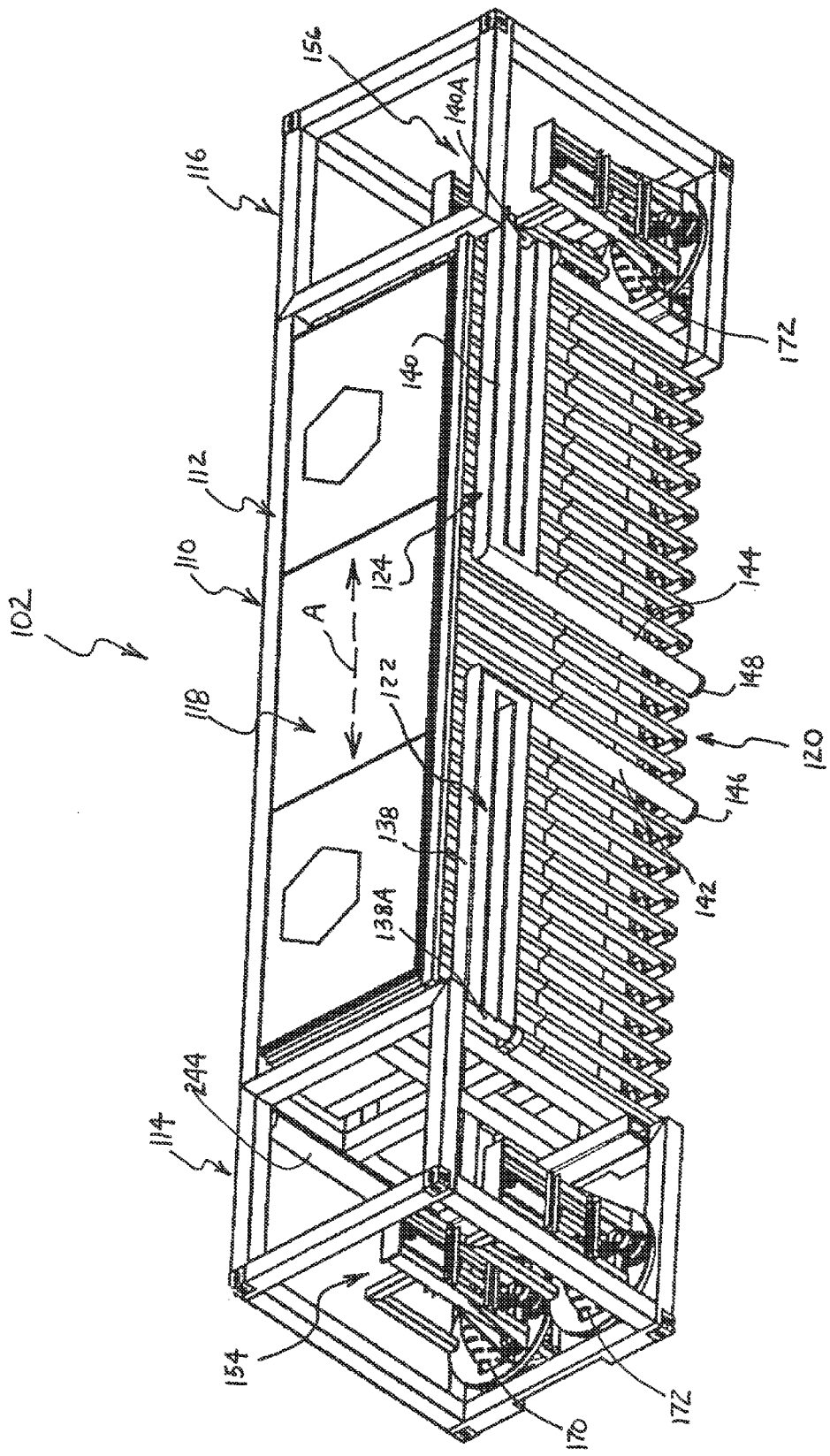
Figure 10:
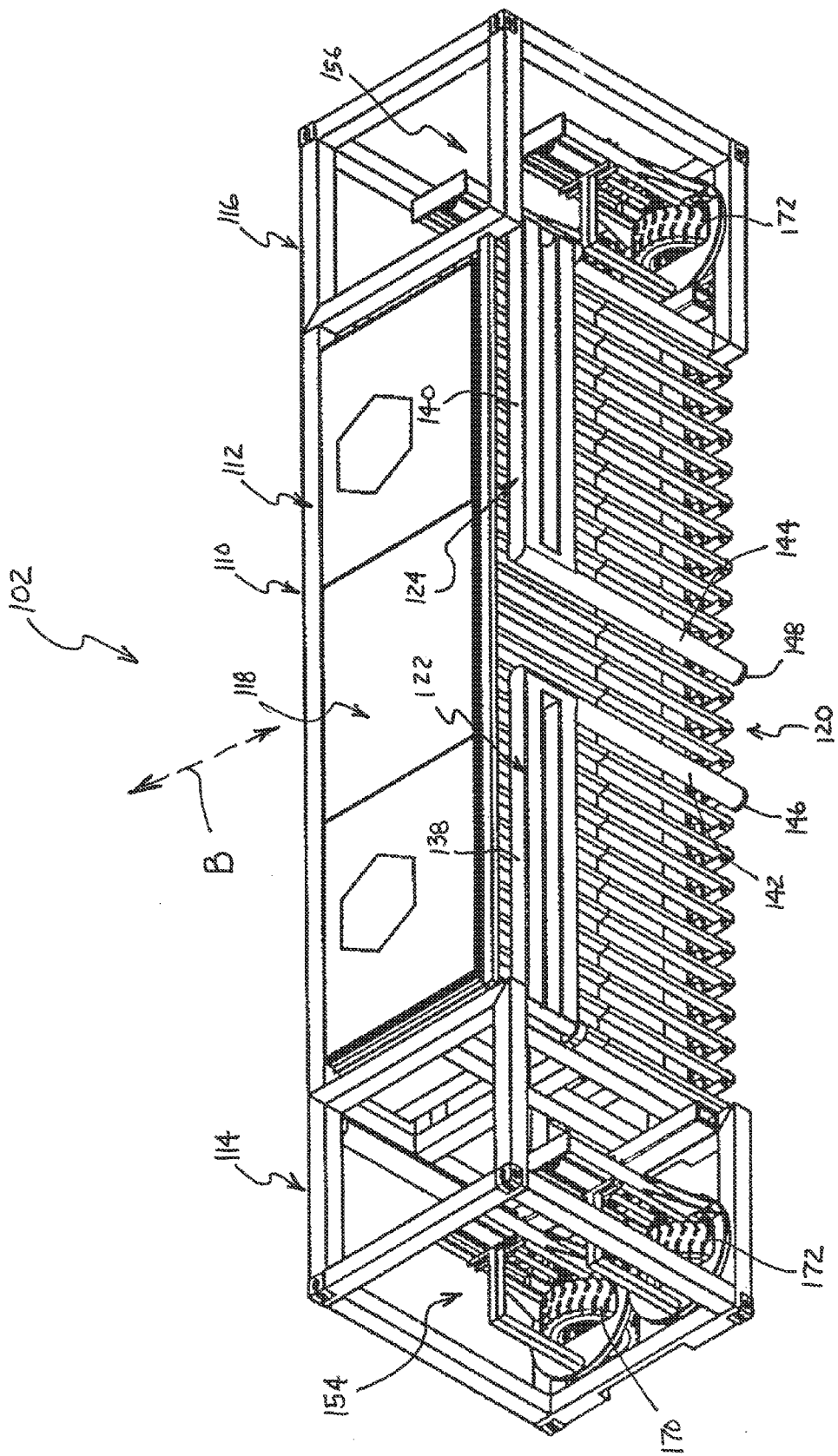

FIG. 10 simply depicts wheels 170, 172 rotated 90 degrees from the position of FIG. 9, which may be accomplished by actuating steering knob 202 of remote control 184. As should be apparent from the drawings, primary stage unit 102 may be moved directly along its longitudinal axis A when wheels are in the position of FIG. 9 and directly along its lateral axis B when wheels are in the position of FIG. 10. The operator controls the orientation and direction of movement of wheel units 154, 156 in this manner using forward button 198, backward button 200 and steering knob 202 of remote control 184 to position primary stage unit 102 quickly, safely, precisely, without additional moving equipment and with minimum damage to the surface on which primary stage unit 102 is positioned.

Figure 11:
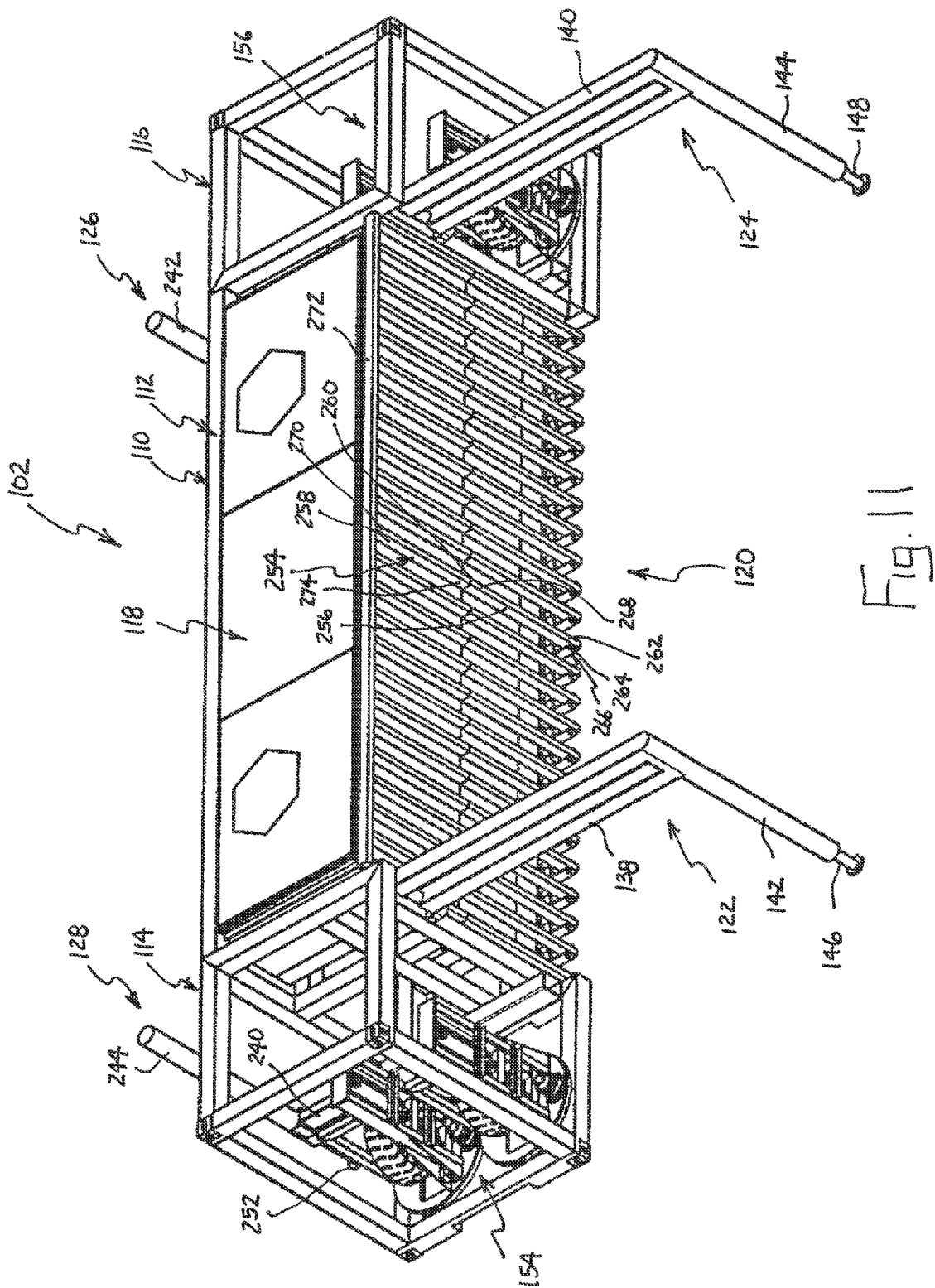

Referring now to FIG. 11, after primary stage unit 102 is positioned in the manner described above, front lateral stage supports 122, 124 and rear lateral stage supports 126, 128 are again moved to their in-use position, and ground-engaging legs 146, 148, 250, 252 are extended to engage the ground using legs down button 220 of remote control 184. Pressure sensors associated with each of ground-engaging legs 146, 148, 250, 252 provide input signals to a controller wherein an increase in pressure above a predetermined threshold indicates that the associated ground-engaging leg has contacted solid ground. Additionally, wheel units 154, 156 are retracted up into wheel housings 114, 116 using wheel units up button 204 so that primary stage unit 102 is again supported by lateral stage supports 122, 124, 126, 128. The operator then actuates leveling button 194 on local control panel 182 which causes a controller within primary stage unit 102 to initiate an auto-leveling sequence. In this sequence, level sensors (not shown) provide input signals to the controller which indicate the amount by which primary stage unit 102 is tilted along its longitudinal and lateral axes. The controller causes appropriate ground-engaging legs 146, 148, 250, 252 to extend or retract, with feedback from the level sensors, to eliminate any tilt in both directions. It should be understood that primary stage unit 102 may be leveled in any of a variety of vertical positions relative to the ground. In one embodiment, main stage floor 120 of primary stage unit 102 may be leveled to a vertical position within the range of 1.2 and 2.4 meters above the ground.

As shown in FIG. 11, main stage floor 120 includes a plurality of horizontal supports 254 aligned in parallel relationship with one another. Each horizontal support 254 includes a rearward section 256, a forward section 258, and an intermediate section 260 (not shown) which is received telescopically by both the rearward section 256 and the forward section 258. One end 262 of each rearward section 256 is attached at a pivotal connection 264 to a support truss 266, which is part of lift mechanism 134 as is described in greater detail below. The other end 268 of each rearward section 256 receives a portion of a corresponding intermediate section 260. One end 270 of each forward section 258 is attached to a forward edge beam 272 of main stage floor 120. The other end 274 of each forward section 258 receives a portion of a corresponding intermediate section 260 of the horizontal support 254.

The operator may lower main stage floor 120 about the plurality of pivot connections 264 between horizontal supports 254 and support trusses 266 by actuating stage tilt (−) button 214 of remote control 184, which activates lift mechanism 134. In this manner, main stage floor 120 pivots downwardly from the position shown in FIG. 11 to the position shown in FIG. 12. Main stage floor 120 includes a forward panel 276, a rearward panel 278, and an intermediate panel 280 disposed between forward panel 276 and rearward panel 278. Forward panel 276 is attached to the plurality of forward sections 258 of horizontal supports 254 (FIG. 11), rearward panel 278 is attached to the plurality of rearward sections 256 of horizontal supports 254, and intermediate panel 280 is supported on top of intermediate sections 260 of horizontal supports 254. As should be apparent from the foregoing, intermediate panel 280 of main stage floor 120 is received telescopically by forward panel 276 and rearward panel 278. During the downward pivoting of main stage floor 120, the plurality of forward sections 258 of horizontal supports 254 are extended hydraulically away from the plurality of rearward sections 256 such that intermediate sections 260 of each horizontal support 254 separates the corresponding forward section 258 from the corresponding rearward section 256. In this process, forward panel 276 is moved outwardly from rearward panel 278, exposing intermediate panel 280 therebetween and increasing the depth of main stage floor 120.

Figure 12:
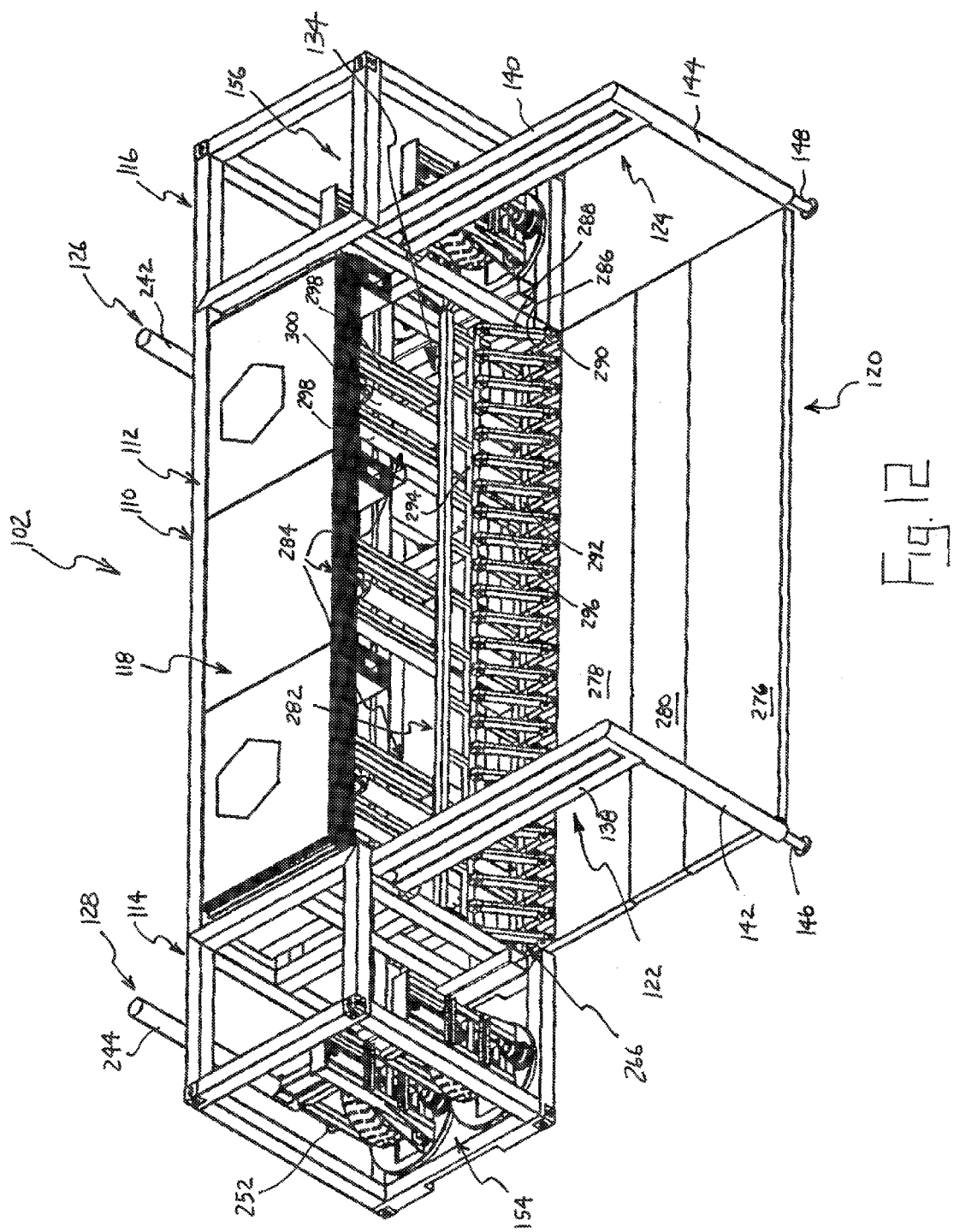

Still referring to FIG. 12, additional components of lift mechanism 134 are shown. In particular, lift mechanism 134 includes support trusses 266, lift truss 282, and lift uprights 284. Support trusses 266 are shown as including a lower beam 286 and a cross beam 288 which is pivotally connected to one end 290 of lower beam 286. As explained above, lower 286 beams are also pivotally connected to rearward sections 256 of horizontal supports 254. Lift truss 282 generally includes a lower beam 292 that extends substantially the length of main stage floor 120, an upper beam 294 that also extends substantially the length of main stage floor 120 parallel to lower beam 292, and a plurality of intermediate beams 296 that extend vertically between lower beam 292 and upper beam 294. Lower beams 286 of support trusses 266 are pivotally attached to lift truss 282 at lower beam 292 and cross beams 288 of support trusses 266 are pivotally attached to upper beam 294 of lift truss 282. Lift truss 282 is attached to each of three lift uprights 284 of lift mechanism 134. Each lift upright 284 functions much the same way as a mast of a standard forklift. Each lift upright 284 includes a pair of vertical columns 298 and a hydraulic actuator 300. When the operator actuates stage up button 216 and stage down button 218, hydraulic actuators 300 of lift uprights 284 power lift truss 282 (and main stage floor 120) upwardly and downwardly as lift truss 282 is guided in a conventional manner by vertical columns 298. In one embodiment, the maximum load capacity of lift mechanism 134 is approximately three tons, which is sufficient for lifting most automobiles.

Referring now to FIGS. 13 and 14, roof assembly 118 is shown in fully raised (FIG. 13) and fully extended (FIG. 14) positions. These figures also show generator 130, which provides power for hydraulic control system 132, lift mechanism 134, and all of the electronic components associated with primary stage unit 102, the buggies and front of house equipment as described below. Roof assembly 118 is raised and lowered using roof up button 220 and roof down button 222 of remote control 184. Roof assembly 118 is extended and retracted using roof in button 224 and roof out button 226 of remote control 184. Roof assembly 118 generally includes a pair of telescopic support columns 302 and a plurality of telescopic roof joists 304 supporting a plurality of roof panels 136. As shown, each support column 302 includes a primary housing 308 fixedly attached to main frame 110, four nested sections 310A-D that are disposed within primary housing 308 when support column 302 is in the stowed position (e.g., as in FIG. 12), and a hydraulic cylinder (not shown) which drives nested sections 310A-D. Each primary housing 308 further includes a measurement system (not shown) having a dedicated PLC (not shown) which monitors the speed and direction of the hydraulic cylinder to synchronize the movement of support columns 302. Support columns 302 are locked in position by a security valve (not shown).

Nested sections 310A-D of each support column 302 are attached to an extension support structure 312 which supports telescopic roof joists 304 and roof panels 136. In one embodiment, each of primary housing 308 and nested sections 310A-D include six sides forming a hexagonal cross-section and a perimeter shoulder 314. When a support column 302 is in the stowed position, shoulder 314 of nested section 310A rests on shoulder 314 of primary housing 308, shoulder 314 of nested section 310B rests on shoulder 314 of nested section 310A, and so on.

Figure 15A:
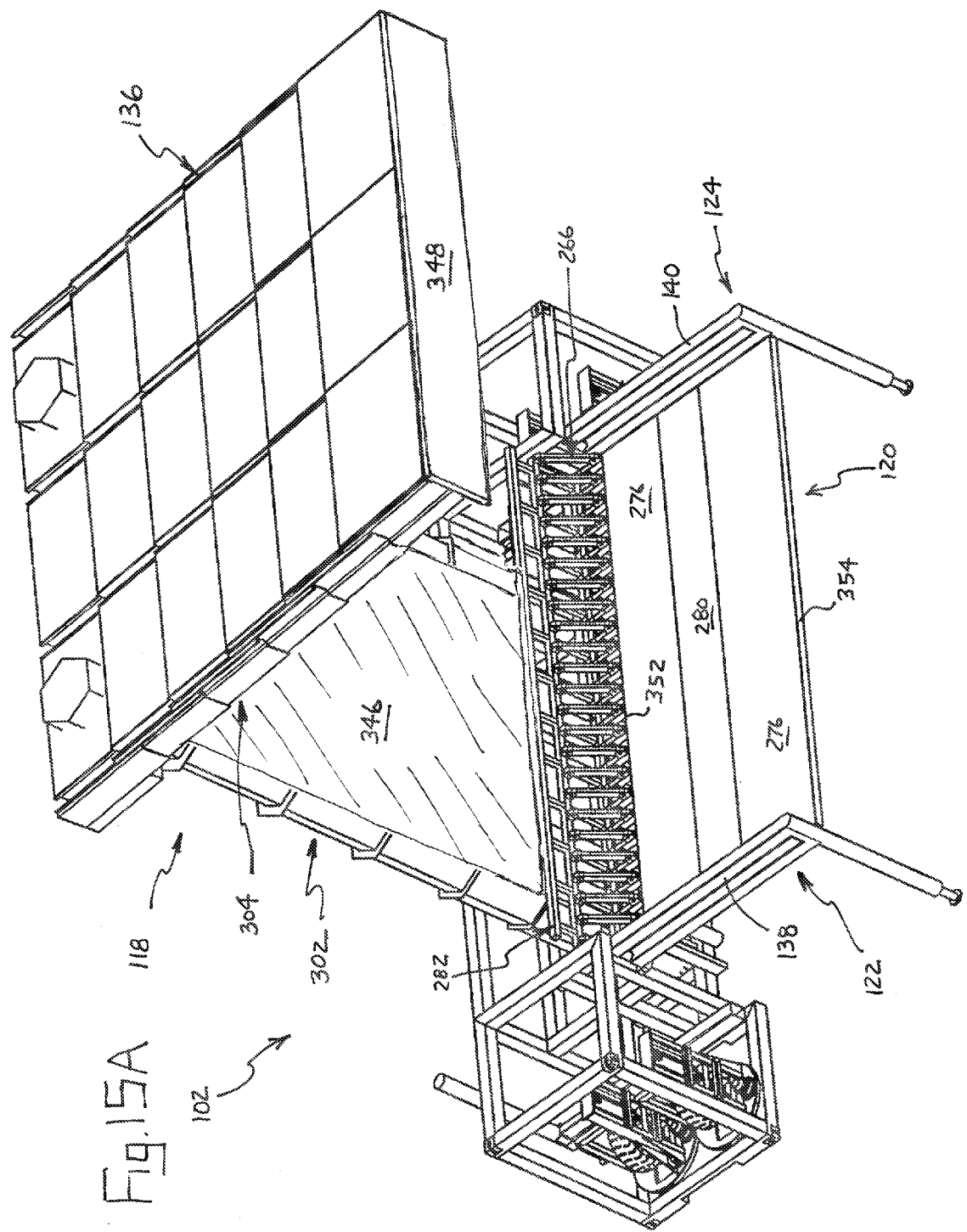

As best shown in FIG. 14, each of telescopic roof joists 304 includes a plurality of joist sections 316A-F. Lighting bars 318 are connected between front roof joist sections 316F, and are used to support lighting equipment (not shown) which is controlled in a manner to enhance the visual impact of the performance. A video signboard is omitted from the preceding figures for clarity, but is shown in FIGS. 15A-B along with a rear screen. In an alternate embodiment, a second set of lighting bars are connected between rear roof joist sections 316A to support additional lighting equipment. In one embodiment, LED lighting technology is employed for primary stage unit 102 because it consumes relatively low power and provides reliable lighting effects in harsh environments. Additionally, LED lights remain relatively cool during operation, which eliminates the need for a cool-down period after the performance. This is consistent with the rapid tear-down and packing requirements of primary stage unit 102.

Joist sections 316A support roof panels 320, which are disposed below the remainder of roof panels 136. Joist sections 316B are telescopically received by joist sections 316A, and include lifter extensions 332. Lifter extensions 332 support roof panels 322, which when extended as shown in FIG. 14, partially overlap roof panels 320 at a rearward edge 334. Similarly, joist sections 316C are telescopically received by joist sections 316B, and include lifter extensions 336. Lifter extensions 336 are somewhat taller than lifter extensions 332 to accommodate for the reduced size of joist sections 316C relative to joist sections 316B and to support roof panels 324 above roof panels 322. Roof panels 324 supported by lifter extensions 336 partially overlap roof panels 322 at a rearward edge 338 when roof assembly 118 is extended as shown in FIG. 14. As should be apparent from the foregoing, each joist section 316A-F of a roof joist 304 is increasingly smaller in diameter the farther it is located from extension support structure 312 and each lifter extension is increasingly taller. In this manner, when roof assembly 118 is extended, roof panels 330 at the forward edge 340 of roof assembly 118 overlap adjacent roof panels 328 disposed nearer to extension support structure 312 in the way shingles of a conventional roof overlap adjacent shingles along the downward slope of the roof. This configuration permits rain, etc. to run from the forward edge 340 of roof assembly 118 toward the rearward edge 342, where the rain runs off roof assembly 118 onto the ground. In one embodiment, the maximum load capacity for roof assembly 118 is three tons and its construction is sufficient to withstand wind speeds of approximately 45 miles per hour.

The operator can control the tilt of roof assembly 118 using roof tilt (+) button 228 and roof tilt (−) button 230. Actuation of these buttons causes activation of a hydraulic drive (not shown) in extension support structure 312 coupled to a pivotal connection (not shown) between extension support structure 312 and upper nested section 310D of each support column 302. In this manner, the tilt of roof assembly 118 relative to horizontal may be adjusted between a tilted orientation (corresponding to an in-use position of roof assembly 118 as shown in FIG. 14) and a horizontal orientation (corresponding to a stowed position of roof assembly 118 as shown in FIG. 2). In one embodiment, the maximum tilt angle is 5 degrees.

It should be understood that support columns 302 may be raised independently of the extension and/or refraction of roof joists 304. Alternatively, support columns 302 and roof joists 304 may be moved simultaneously to reduce the time required to deploy and/or stow roof assembly 118. Additionally, roof joists 304 may be fully deployed while support columns 302 are only partially raised. This enables workers to access lighting equipment suspended from roof joists 304 (as described below), attach banners and/or signs to roof joists 304, etc. without the need for scaffolding or ladders.

Referring now to FIG. 15A, main stage floor 120 is depicted as raised to an in-use position roughly corresponding to the height of horizontal supports 138, 140. Again, this movement of main stage floor 120 is accomplished by actuation of hydraulic control system 132 (which powers lift mechanism 134) using stage up button 216 of remote control 184. More specifically, hydraulic actuators 300 of lift uprights 284 raise lift truss 282 along vertical columns 298 until main stage floor 120 is at the desired elevation. At this point in the deployment process, primary stage unit 102 is fully positioned and deployed.

Primary stage unit 102 further includes a rear screen 346 supported between support columns 302, and a forward video signboard 348. Rear screen 346 may be a roll-up or foldable projector screen capable of providing relatively low-resolution video to accompany the performance. In one embodiment, rear screen 346 is approximately 23 feet by 20 feet when unrolled, with a 37 mm pitch and 192×160 resolution. The brightness specification is 2300 and horizontal and vertical view angles are greater than 120 degrees. A suitable rear screen 346 may be the F-37L manufactured by XL Video. Video signboard 348 is supported by the forward ends 350 (FIG. 14) of roof joist sections 316F. In one embodiment, video signboard 348 is configured to provide textual displays and is approximately 2 feet tall and 20 feet wide. A suitable video signboard 348 may be a high resolution, outdoor screen manufactured by BetoLED.

It should also be noted that because of the pivotal connections between main stage floor 120 and lift mechanism 134, main stage floor 120 may be tilted (using stage tilt (+) button 121 and/or stage tilt (−) button 214) such that the rear edge 352 of main stage floor 120 is higher than the forward edge 354 of main stage floor 120. In one embodiment, the maximum tilt angle of main stage floor 120 is 30 degrees relative to horizontal. This tilting feature permits, for example, enhanced display of products such as automobiles supported by main stage floor 120. By tilting such objects, they are presented in a more natural viewing orientation when viewed from attendees of the event standing on the ground. This is particularly useful for attendees close to main stage floor 120 when main stage floor 120 is at its maximum elevation.

In another embodiment shown in FIG. 15B, a portion of main stage floor 120 is configured to rotate, either when horizontally oriented or when tilted, thereby providing a 360 degree view of objects positioned on main stage floor 120. More specifically, main stage floor 120 may be adapted to receive a turntable 351 configured to attach to main stage floor 120 when main stage floor is in the in-use position. Turntable 351 includes a base 355 which may be coupled to the hydraulic or electrical power provided by primary stage unit 102 and remotely controlled by control 184 to rotate as indicated by arrow D. A plurality of arms 357A-D are coupled to base 355 and sized (or adjustable) to receive a vehicle having a standard wheel base. Turntable may be mounted to main stage floor 120 when floor is in a lowed position as shown in FIG. 14, and the vehicle (or other object) to be displayed may be moved onto arms 357A-D. When main stage floor 120 is raised to the position of FIG. 15B, turntable 351 may be activated to provide a 360 degree display of the vehicle (or other object).

FIG. 16 provides a side view of secondary stage unit 104, with some of the contents of secondary stage unit 104 shown in dotted lines. As indicated above, like primary stage unit 102, secondary stage unit 104 is transported on a conventional trailer 106 of a semi-truck 108. Secondary stage unit 104 includes a combustion engine 360 equipped with a battery/alternator system (not shown). Engine 360 provides hydraulic power to equipment for lifting secondary stage unit 104 off of trailer 106 and electrical power to the electrical equipment as described below.

Secondary stage unit 104 further includes a pair of front, telescopically extendable lateral supports 362, 364, and a pair of rear, telescopically extendable lateral supports (not shown in FIG. 16). Similar to rear stage supports 126, 128 of primary stage unit 102 (FIG. 5), each of the four lateral supports of secondary stage unit 104 includes a support housing (not shown) mounted to container 378, a lateral arm (not shown) that is telescopically movable within the support housing, a vertical support 366, 368 connected to an end of the lateral arm, and a ground-engaging leg 370, 372 that telescopically and hydraulically movable into and out of the vertical support 366, 368.

The four lateral supports 362, 364 are used to automatically unload secondary stage unit 104 in the same manner as the counterpart supports of primary stage unit 102 as described above with reference to FIGS. 5-9.

Figure 17:
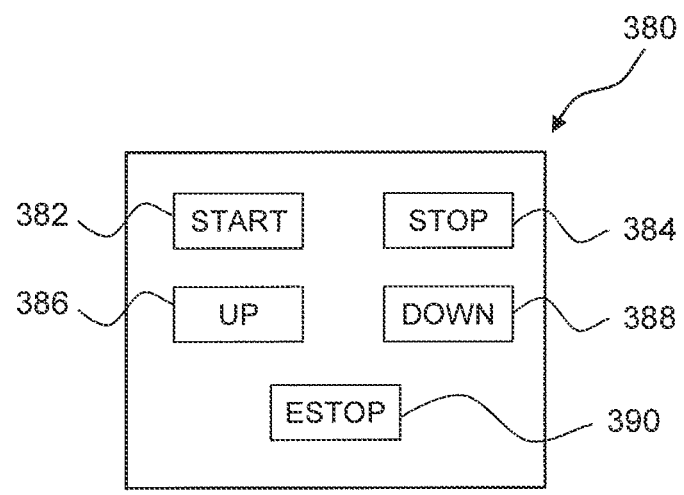
FIG. 17 is a conceptual view of a secondary stage unit local control panel.

FIG. 17 shows a local control panel 380 which is mounted in a convenient and accessible position on secondary stage unit 104 as shown in FIG. 16. Local control panel 380 includes a start button 382, a stop button 384, a legs up button 386, a legs down button 388 and an emergency stop button 390. Start button 382 activates engine 360 and a hydraulic power pack (not shown) mounted to secondary stage unit 104, which powers the movement of lateral supports 362, 364. After activating the hydraulic power pack, the operator actuates legs down button 388, which causes all four lateral supports 362, 364 to move outwardly away from container 378 while secondary stage unit 104 is positioned on trailer 106. Ground-engaging legs 370, 372 then extend downwardly from each of the four lateral supports 362, 364 until secondary stage unit 104 is fully supported by the supports. Truck 108 and trailer 106 are then driven away from secondary stage unit 104. The operator then actuates legs up button 386, which causes the ground-engaging legs to retract back into the four supports 362, 364, lowering secondary stage unit 104 onto the ground. The supports then move back into their stowed position. As described below, secondary stage unit 104 may be automatically unloaded at any location in the vicinity of primary stage unit 102 (e.g., on a nearby access road) because the contents of secondary stage unit 104 are moved to their final positions by remote control. Consequently, secondary stage unit 104 can be positioned in an unobtrusive location and without causing damage to the ground surface of the venue.

Referring back to FIG. 16, secondary stage unit 104 further includes a pair of video buggies 392, a pair of stage buggies 394, front of house sound, lighting and video equipment 396, and cabling (not shown) for connecting video buggies 392 and front of house equipment 396 to primary stage unit 102. Buggies 392, 394 are stowed in container 378 of secondary stage unit 104 in a collapsed, stacked configuration, with a pair of stage buggies 394 resting on the floor 398 of container 378 in positions 1 and 2 and a pair of video buggies 392 suspended from the ceiling 400 of container 378 in positions 3 and 4, as is further described below. Stage buggies 394 and video buggies 392 may be located in any of the four positions shown in FIG. 16, as long as all buggies 392, 394 are configured for suspension from ceiling 400. It should be understood that any suitable means for suspending buggies 392 from ceiling 400 may be employed. In one embodiment, container ceiling 400 is provided with hooks (not shown) which engage openings (not shown) formed on video buggies 392.

As explained below, video buggies 392 include scissor lifts which raise and lower an upper frame. Video buggies 392 can be raised in the manner described below when in container 378 such that the hooks on ceiling 400 may be coupled to the openings on the upper frames. The scissor lifts may then be actuated to lift video buggies 392 off of floor 398 of container 378 into positions 3 and 4. They may be lowered from positions 3 and 4 by reversing this process. Alternatively, conventional hoist systems powered by hydraulic power pack may be used to provide push-button lifting and lowering of the suspended buggies 392. In yet another alternate embodiment, manual or automatic pulley systems may be used. Additionally, stabilization members may be attached to suspended buggies 392 and side walls of container 378 to prevent excessive lateral motion of suspended buggies 392 during transport on trailer 106.

Figure 18:
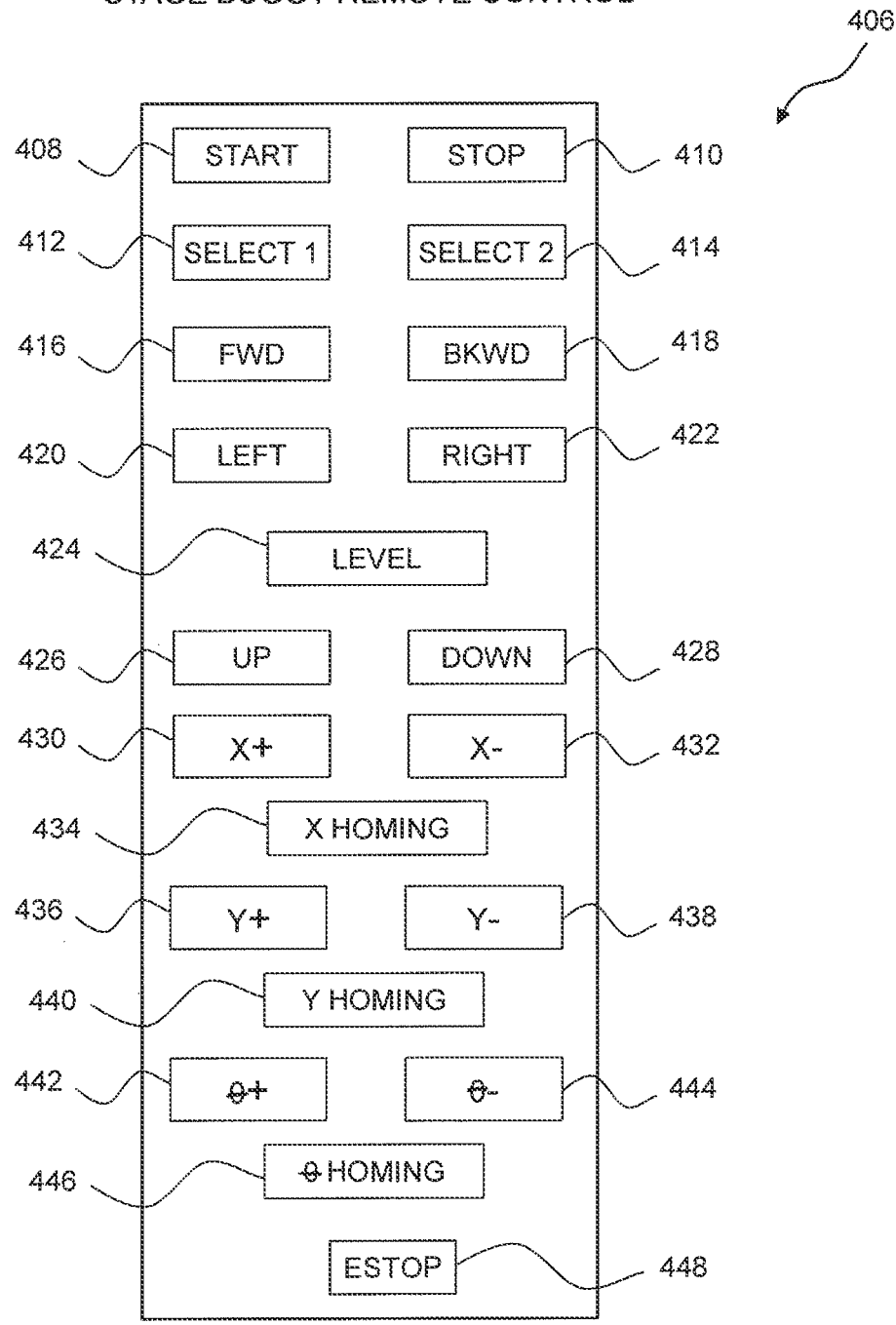
FIG. 18 is a conceptual view of a stage buggy remote control.

After secondary stage unit 104 is automatically unloaded in the manner described above, a door 402 at one end 404 of container 378 is opened to permit unloading of buggies 392, 394. To unload the buggies, stage buggy 394 in position 1 is first powered on using remote control 406 depicted in FIG. 18. Remote control 406 includes a start button 408, a stop button 410, a buggy select 1 button 412, a buggy select 2 button 414, a forward button 416, a rearward button 418, a left button 420, a right button 422, a level button 424, an up button 426, a down button 428, an X (+) button 430, an X (−) button 432, an X homing button 434, a Y (+) button 436, a Y (−) button 438, a Y homing button 440, a theta (+) button 442, a theta (−) button 444, a theta homing button 446, and an emergency stop button 448.

The operator moves stage buggy 394 from position 1 by first actuating buggy select 1 button 412 of remote control 406, then actuating start button 408 which activates an engine (described below) of buggy 394. The operator uses one of forward button 416 or rearward button 418 (and possibly left button 420 and/or right button 422) to drive stage buggy 394 out of container 378 and onto the ground. Stage buggy 394 in position 2 is similarly selected, powered and driven using remote control 406 out of container 378 and onto the ground. The operator may then enter container 378 and disconnect any stabilization members attached to video buggies 392. The suspension mechanism suspending video buggies 392 is then actuated to lower buggies 392 onto floor 398 of container 378. The operator then disconnects the suspension mechanism from video buggies 392.

Figure 19:
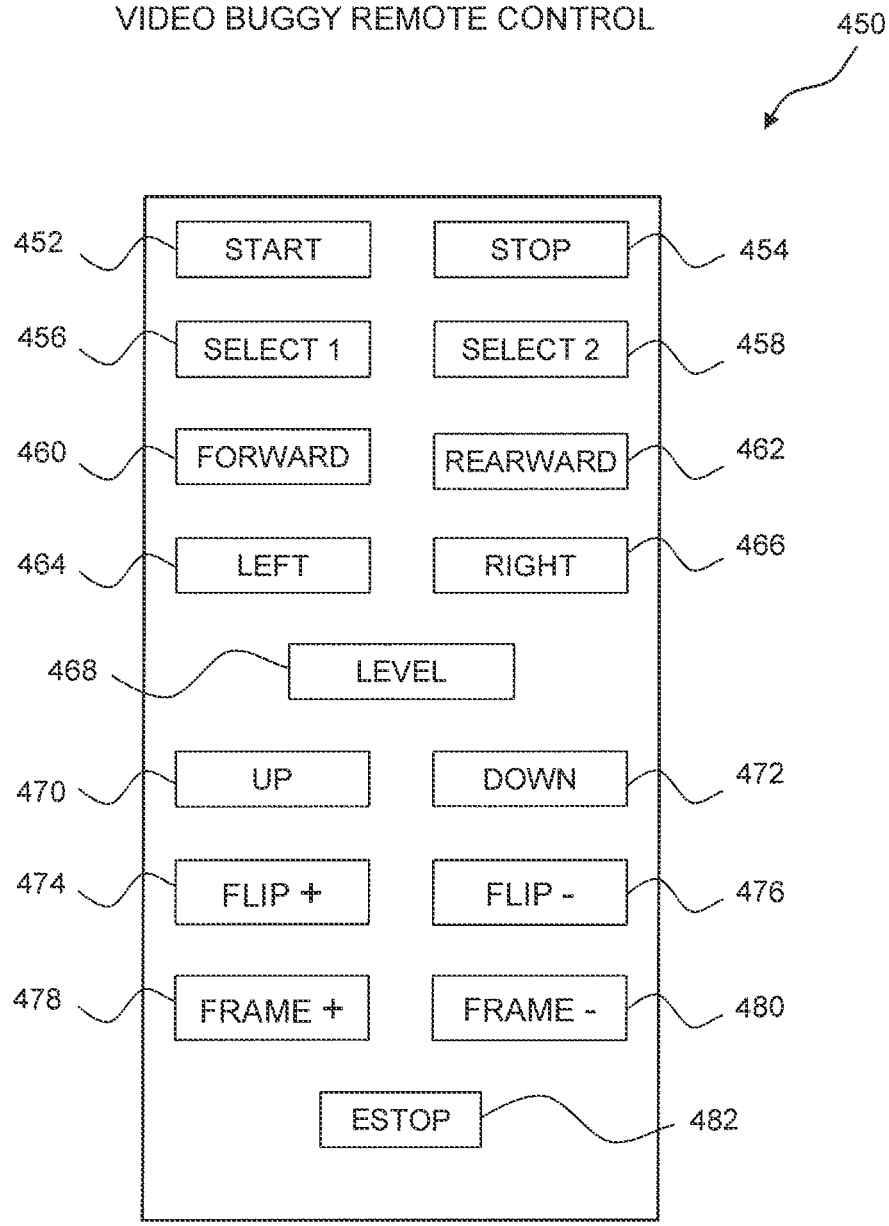
FIG. 19 is a conceptual view of a video buggy remote control.

The operator then activates and drives video buggies 392, one after the other, out of container 378 and onto the ground in a manner similar to that described above using remote control 450 depicted in FIG. 19. Remote control 450 includes a start button 452, a stop button 454, a buggy select 1 button 456, a buggy select 2 button 458, a forward button 460, a rearward button 462, a left button 464, a right button 466, a level button 468, an up button 470, a down button 472, a flip (+) button 474, a flip (−) button 476, a frame (+) button 478, a frame (−) button 480, and an emergency stop button 482.

Figure 20:
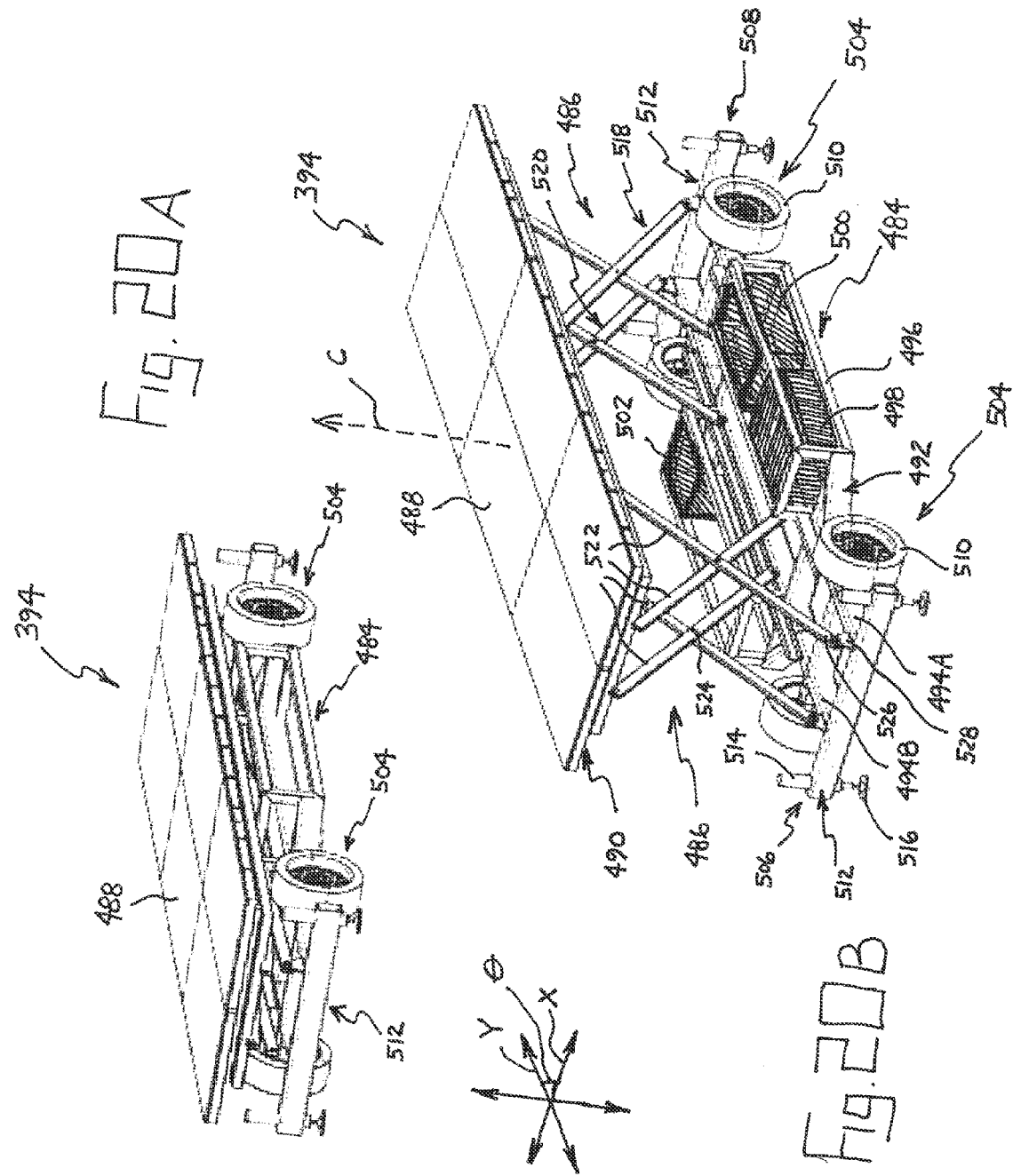
FIGS. 20A and 20B are perspective views of a stage buggy according to the teachings of the present disclosure.

FIGS. 20A and 20B are perspective views of stage buggy 394 in a collapsed or stowed position and in-use position, respectively. As stage buggies 394 are identical, only one is described herein. Stage buggy 394 generally includes a main frame 484, a pair of scissor lifts 486, and a platform 488 supported by a platform frame 490. Main frame 484 includes a chassis 492 with a pair of parallel longitudinal members 494A-B and a central container 496 for storing an engine 498, a fuel tank 500 and receiver/controller 502. A pair of wheel assemblies 504 are mounted to longitudinal members 494A-B at each end 506, 508 of chassis 492. At least one of wheel assemblies 504 is "steerable" in that its wheels 510 may be directed at an angle relative to a longitudinal axis of stage buggy 394. Additionally, at least one of wheel assemblies 504 is connected to a drive mechanism (not shown) powered by engine 498. It should be understood, however, that both wheel assemblies 504 may be steerable and connected to the drive mechanism, and may be configured to provide normal steering, counter steering, and parallel steering. Main frame 484 further includes a leveling outrigger 512 mounted to each end 506, 508 of longitudinal members 494A-B. Each leveling outrigger 512 includes a leg housing 514 at each end, and a ground-engaging leg 516 that may be moved into and out of leg housing 514 to level stage buggy 394 in the manner described below.

Each scissor lift 486 generally includes a first scissor support 518 movably attached to longitudinal member 494A of main frame 484 and a second scissor support 520 movably attached to longitudinal member 494B of main frame 484. Each scissor support 518, 520 includes a pair of braces 522 that are pivotally connected to one another at a mid-point 524 as shown. As will be readily apparent to one of skill in the art, the ends of braces 522 are pivotally connected to longitudinal members 494A-B and platform frame 490, and at least one end 526 of braces 522 is connected to a bracket 528 that is movable in a guide along a portion of the corresponding longitudinal member 944A-B. In this manner, and under the power of engine 498, scissor lifts 486 may be actuated simultaneously to raise and lower platform 488 of stage buggy 394.

Figure 21:
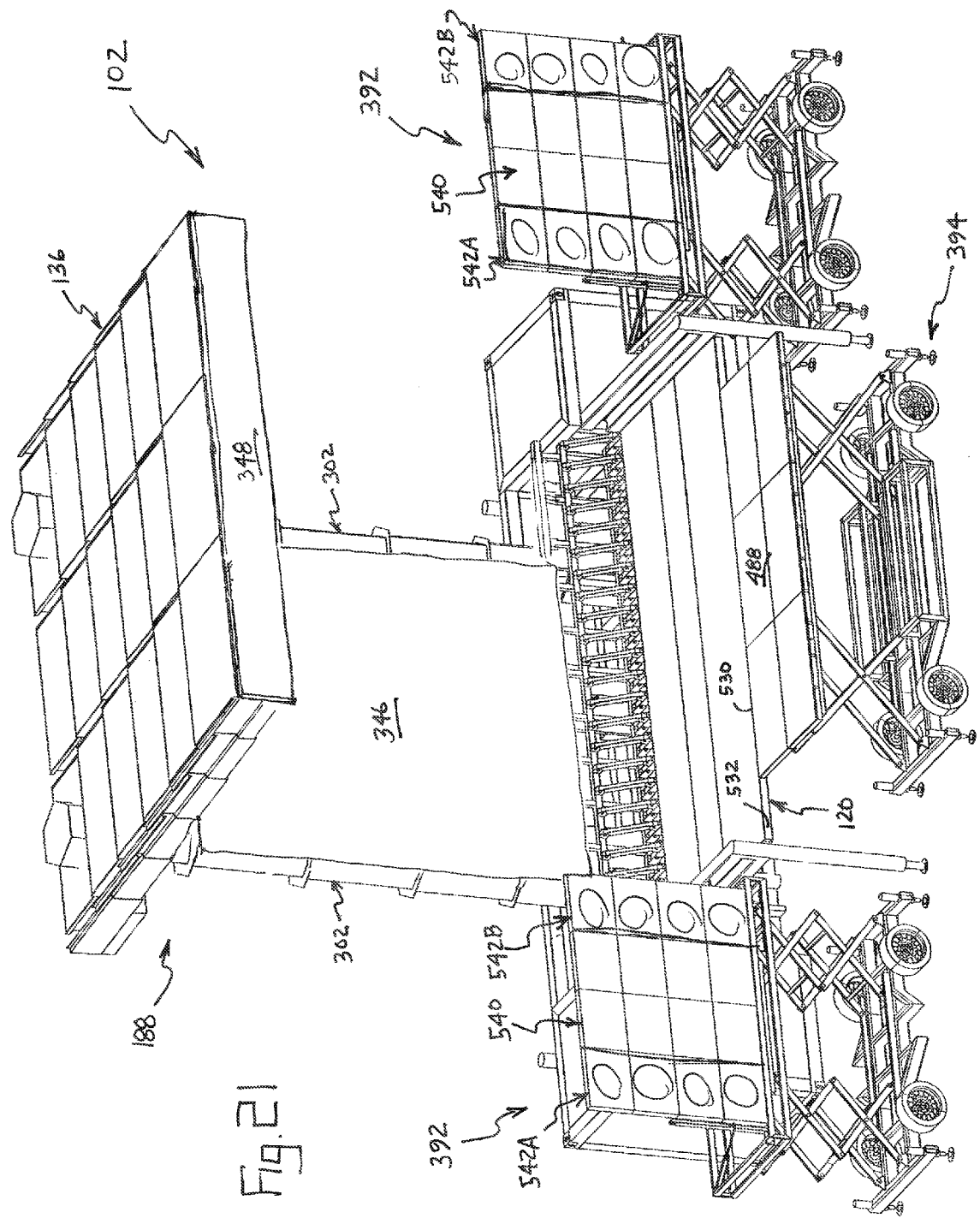
FIG. 21 is a perspective view of a fully deployed staging system according to the present disclosure.

In operation, an operator uses forward button 416, rearward button 418, left button 420, and right button 422 of remote control 406 to drive stage buggy 394 to a desired location such as adjacent main stage floor 120 as shown in FIG. 21. In this position, platform 488 of stage buggy 394 substantially increases the overall stage area available for the performance. In one embodiment, platform 488 is 30'2" long and 9'10" wide, thereby increasing the overall stage area by nearly 300 square feet.

When stage buggy 394 reaches its approximate location, the operator actuates level button 424 on remote control 406 to cause receiver/controller 502 of stage buggy 394 to initiate an auto-level sequence. In this sequence, ground-engaging legs 516 are extended from leg housings 514 until each leg 516 engages the ground. Each leg 516 is equipped with a pressure sensor (not shown) which enables receiver/controller 502 to detect when the leg 516 engages the ground. Receiver/controller 502 further includes a gravity sensor (not shown) which supplies a tilt angle for buggy 394 in the X and Y directions. Receiver/controller 502 uses the tilt angles in a measure and correct cycle which controls ground-engaging legs 516 to compensate in an iterative fashion for any initial unbalance of buggy 394.

Next, the operator actuates up button 426 on remote control 406 which causes receiver/controller 502 to power scissor lifts 486, thereby raising platform 488. In the example shown in FIG. 21, platform 488 is positioned parallel to and in the same plane as main stage floor 120. A fine control or lift speed feature may be provided on remote control 406 to permit accurate elevation adjustments to platform 488.

Stage buggy 394 further includes an X/Y/theta adjustment mechanism (not shown) for moving platform 488 a relatively small distance in the X direction, the Y direction, and pivotally through an angle theta about a vertical axis C of platform 488 as indicated in FIG. 20B. These movements are controlled by the operator using X (+) button 430, X (−) button 432, X homing button 434, Y (+) button 436, Y (−) button 438, Y homing button 440, theta (+) button 442, theta (−) button 444, and theta homing button 446. In one embodiment, the adjustment mechanism is located in platform frame 490 and includes a plurality of screw drives that cause movement of platform 488 relative to platform frame 490 in each of these directions. One of ordinary skill in the art will appreciate that many of a variety of conventional position adjustment techniques may be employed on stage buggy 394 to accomplish these position adjustments. Such position adjustments are desirable in that it may be difficult or impossible to precisely align edge 530 (FIG. 21) of stage buggy 394 with edge 532 (FIG. 21) of main stage floor 120 by simply driving stage buggy into position. Fine X/Y/theta position adjustment prevents any potentially dangerous gap between edge 530 and edge 532. When stage buggy 394 is in its final position, skirts (not shown) may be attached to platform frame 490 to hide the interior components of buggy 394. It should be understood that in one embodiment, stage buggy 394 extends the full length of main stage 120, unlike stage buggy 394 shown in FIG. 21.

As the operator adjusts the position of platform 488 in the X/Y/theta directions, platform 488 is moved out of its "home" position which is shown in FIG. 20B. When in the home position, platform 488 is positioned parallel to main frame 484 (i.e., no rotation in the theta direction) and substantially centered in the X and Y directions over scissor lifts 486. In other words, platform 488 is in an orientation ready to be moved downwardly through retraction of scissor lifts 486 from the in-use position of FIG. 20B to the stowed position of FIG. 20A. The operator may readily return platform 488 to the home position after the performance by actuating X homing button 434, Y homing button 440 and theta homing button 446. As platform 488 moves in response to actuation of the X homing button 434, for example, it eventually trips a switch that provides a signal to the adjustment mechanism indicating that platform 488 has reached the home position in the X direction. In this manner, the operator does not need to visually ensure that platform 488 is in the home position before actuating scissor lifts 486 to stow stage buggy 394.

The second stage buggy 394 is deployed in the manner described above with reference to stage buggy 394. In one configuration, the second stage buggy 394 is positioned parallel to and in alignment with stage buggy 394. In another configuration, the second stage buggy 394 is positioned perpendicular to and in alignment with stage buggy 394 to provide a runway type configuration for the performance. Of course, either stage buggy 394 may be positioned at any desired location to enhance the performance environment.

Figure 22:
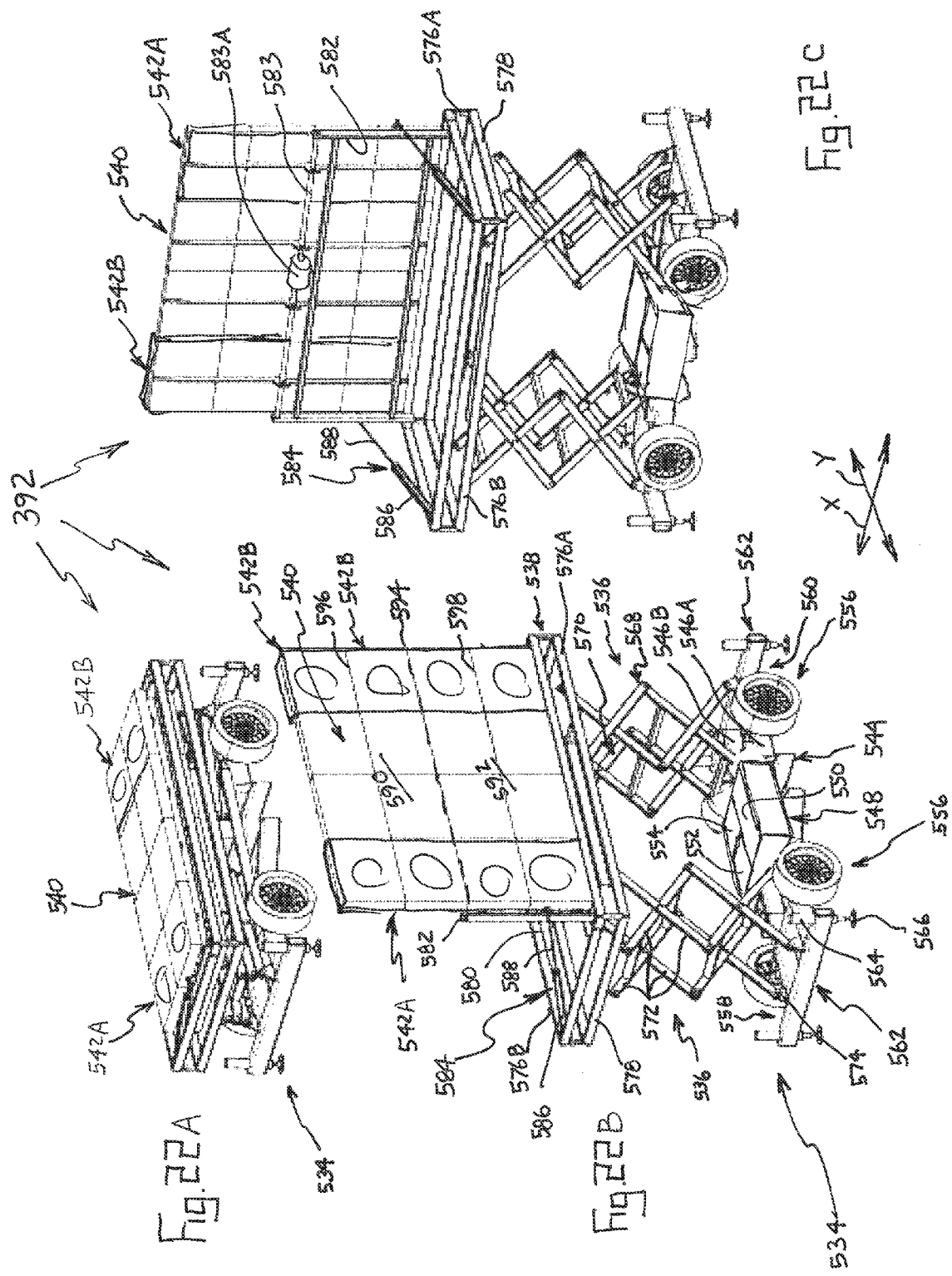
FIGS. 22A through 22C are perspective views of a video buggy according to the teachings of the present disclosure.

Referring now to FIGS. 22A-C, video buggies 392 include a variety of components that are similar to components of stage buggies 394. Again, as video buggies 392 are identical, only one is described in detail below. Video buggy 392 generally includes a main frame 534, a pair of scissor lifts 536, an upper frame 538, a high-resolution video display 540 and a pair of speakers 542A-B. Main frame 534 generally includes a chassis 544 with a pair of longitudinal members 546A-B and a central container 548 for storing a diesel engine 550, a fuel tank 552 and a receiver/controller 554. A pair of wheel assemblies 556 are mounted to longitudinal members 546A-B at each end 558, 560 of chassis 544. At least one of wheel assemblies 556 is "steerable" and at least one of wheel assemblies 556 is connected to a drive mechanism (not shown) powered by engine 550. As with stage buggies 394, both wheel assemblies 556 may be steerable and connected to the drive mechanism, and may be configured to provide normal steering, counter steering and parallel steering. Main frame 534 further includes a leveling outrigger 562 mounted to each end of longitudinal members 546A-B. Each leveling outrigger 562 includes a leg housing 564 at each end, and a ground-engaging leg 566 that may be moved into and out of leg housing 564 to level video buggy 392 in the manner described below.

Each scissor lift 536 generally includes a first scissor support 568 movably attached to longitudinal member 546A of main frame 534 and a second scissor support 570 movably attached to longitudinal member 546B of main frame 534. Each scissor support 568, 570 includes a plurality of braces 572 that are pivotally connected to one another in the manner shown. As will be readily apparent to one of skill in the art, scissor supports 568, 570 are pivotally connected to longitudinal members 546A-B and upper frame 538, and at least two braces 572 of each scissor support 568, 570 is connected to a bracket 574 that is movable in a guide along a portion of the corresponding longitudinal member 546A-B and relative to upper frame 538. In this manner, and under the power of engine 550, scissor lifts 536 may be actuated simultaneously to raise and lower upper frame 538 of video buggy 392.

Upper frame 538 includes a pair of side members 576A-B and a pair of end members 578 attached to one another to define an interior volume 580 for receiving display 540 and speakers 542A-B in the manner described below. Upper frame 538 further includes a support frame 582 pivotally connected to side member 576A, and a pair of actuators 584. Each actuator 584 includes a cylinder 586 pivotally connected to side member 576B and a hydraulically actuated rod 588 that is movable into and out of cylinder 586 and is pivotally connected at one end to support frame 582.

Display 540 is mounted to support frame 582. In general, display 540 includes an upper half 590 and a lower half 592, and is foldable onto itself about a fold axis 594. In one embodiment, display 540 is 14'9" wide and 8'10" tall when unfolded. It provides a 16:9 format image, 360 Hz refresh rate, with 11 mm pitch and 360×280 resolution. Brightness is 5500 and the horizontal and vertical viewing angles are greater than 160 degrees. A suitable display 540 may be the F-11 display manufactured by XL Video.

Like display 540, speakers 542A-B each include an upper half 596 and a lower half 598, which is mounted to support frame 582. Upper half 596 is foldable onto lower half 598 about fold axis 594. In one embodiment, speakers 542A-B are equivalent to speakers of an Iconyx IC Live System by Renkus Heinz or a Mina System by Meyer Sound, which generate user-defined sound beams for high and mid range. In one embodiment, speakers 542A-B are mounted on a rotatable table such that they may be directed slightly toward or away from display to customize the distribution of sound for a particular venue.

In operation, an operator uses forward button 460, rearward button 462, left button 464 and right button 466 of remote control 450 to drive video buggy 392 to a desired location such as adjacent main stage floor 120 as shown in FIG. 21. When video buggy 392 reaches the desired location, the operator actuates level button 468 on remote control 450 to cause receiver/controller 554 of video buggy 392 to initiate an auto-level sequence. In this sequence, ground-engaging legs 566 are extended from leg housings 564 until each leg 566 engages the ground. Each leg 566 is equipped with a pressure sensor (not shown) which enables receiver/controller 554 to detect when the leg 566 engages the ground. Receiver/controller 554 further includes a gravity sensor (not shown) which supplies a tilt angle for buggy 392 in the X and Y directions. Receiver/controller 554 uses the tilt angles in a measure and correct cycle which controls ground-engaging legs 566 to compensate in an iterative fashion for any initial unbalance of buggy 392.

Next, the operator actuates up button 470 on remote control 450 which causes receiver/controller 554 to power scissor lifts 536, thereby raising upper frame 538 to the desired elevation. In the example shown in FIG. 21, upper frame 538 is positioned at an elevation approximately equal to that of main stage floor 120. Next, the operator actuates frame (+) button 478 on remote control 450 which causes receiver/controller 554 to activate actuators 584, thereby raising speakers 542A-B and display 540 from the folded, stowed position (shown in FIG. 22A), to a substantially vertical position (shown in FIGS. 22B-C). After or during movement of speakers 542A-B and display 540 to the vertical position, the operator actuates flip (+) button 474 of remote control 450 which actuates motor/reduction combination 583A. Motor/reduction combination 583A is coupled to hinge 583 to cause rotational movement of hinge about fold axis 594, which in turn causes upper halves 596 of speakers 542A-B and upper half 590 of display 540 to pivot about fold axis 594 on hinge 583 as shown in FIG. 22C. In an alternate embodiment, speakers 542A-B are not foldable, and instead have a height corresponding to approximately one-half the height of display 540 when in its unfolded state. In this embodiment, display 540 may be carried on frame 582 and include a separate actuator 584, and speakers 542A-B may be carried on their own frames powered by actuators 584 mounted adjacent end members 578. When video buggy 392 is in its final position, skirts (not shown) may be attached to upper frame 538 to hide the interior components of buggy 392.

Figure 23:
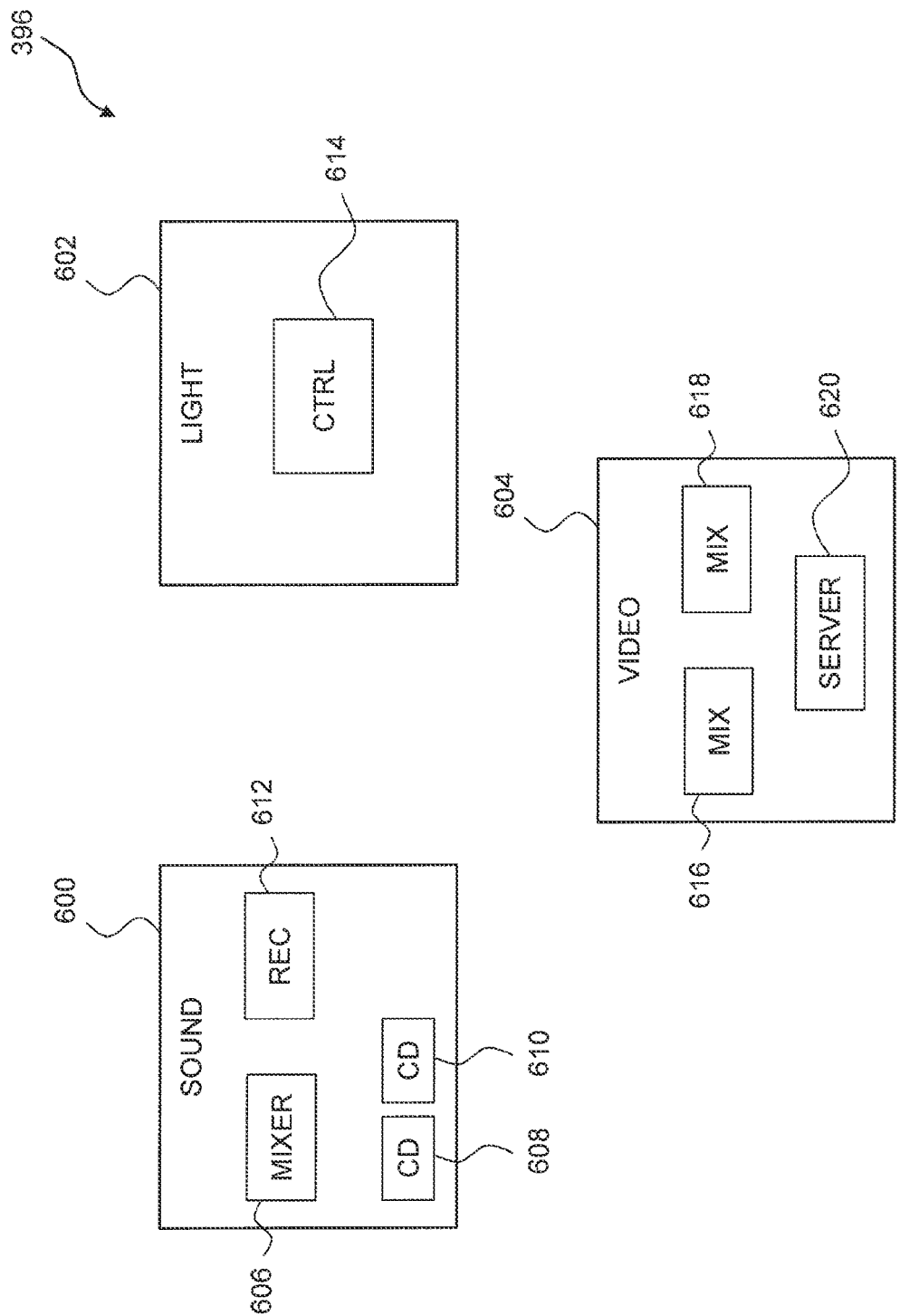
FIG. 23 is a conceptual view of front of house equipment for use in the system of the present disclosure.

As shown in FIG. 23, front of house equipment 396 includes a sound flight case 600, a light flight case 602, and a video flight case 604. As explained below, each of flight cases 600, 602, 604 can be used as support furniture for the equipment contained therein. Sound flight case 600 includes a sound mixer 606, such as an M 300 Mixer manufactured by Roland, two CD players 608, 610, and a wireless receiver 612, such as a receiver manufactured by Wisycom. Light flight case 602 includes a light controller 614, such as an ETC ION console. Video flight case 604 includes two video mixers 616, 618, such as the V-1600 HD mixers manufactured by Roland, and a media server 620, such as an Arkaos media server.

As should be apparent from the foregoing, after the performance, the operators return primary stage unit 102 to its stowed position (FIG. 1) and return the equipment and buggies to their stowed position (FIG. 1) in container 378 using the various remote and local controls according to a procedure that is substantially the opposite of the deployment procedure described above.

While exemplary embodiments incorporating the principles of the present teachings have been disclosed hereinabove, the present teachings are not limited to the disclosed embodiments. Instead, this application is intended to cover any variations, uses, or adaptations of the disclosed general principles. Further, this application is intended to cover such departures from the present disclosure as come within known or customary practice in the art to which this application pertains and which fall within the limits of the appended claims.

What is claimed is:

1. A primary stage unit configured for transport on a standard semi-truck trailer including:
    a plurality of lateral supports that are controllable by remote control to engage the ground and lift the primary stage unit off of the trailer,
    a pair of wheel units that are controllable by remote control to engage the ground and move the primary stage unit to a desired location,
    a main stage floor that is controllable by remote control to pivot from a substantially vertical stowed position to a substantially horizontal in-use position and to move vertically to a desired height,
    a roof assembly including a pair of support columns that are controllable by remote control to extend telescopically from a stowed position to an in-use position, and a plurality of roof joists supporting a corresponding plurality of roof panels, the roof joists being controllable by remote control to move between a retracted position and an extended position, wherein the roof panels are supported above the main stage floor.

2. The primary stage unit of claim 1, wherein the primary stage unit includes a main frame that, when in a stowed configuration, has a volume that is approximately the same as a volume of a standard cargo container.

3. The primary stage unit of claim 1, further including a primary stage unit remote control including a transmitter configured to transmit signals to the primary stage unit to remotely actuate the lateral supports, remotely steer the wheel units, remotely actuate the main stage, and remotely actuate the roof assembly.

4. The primary stage unit of claim 1, further including a local control panel mounted to the primary stage unit including a transmitter configured to transmit signals to the primary stage unit to activate a generator mounted to the primary stage unit, and actuate the lateral supports.

5. The primary stage unit of claim 4, wherein the local control panel further includes a level button, activation of which transmits a signal to a controller of the primary stage unit causing the controller to control the lateral supports through an auto-leveling sequence which adjusts the positions of the ground-engaging legs, as necessary, to cause the primary stage unit to assume a substantially level orientation.

6. The primary stage unit of claim 1, wherein the lateral supports include a pair of front lateral supports and a pair of rear lateral supports, each front lateral support including a horizontal support having one end pivotally attached to a main frame of the primary stage unit and another end connected to a vertical support housing a ground-engaging leg, and each rear lateral support including a support housing mounted to the main frame, a telescopically movable lateral arm, and a vertical support connected to the lateral arm and housing a ground-engaging leg.

7. The primary stage unit of claim 1, wherein each wheel unit is mounted within a support structure of a main frame, and includes a pair of wheel supports each supporting a wheel, and a vertical drive unit that raises and lowers the wheels through an opening in a floor of the support structure.

8. The primary stage unit of claim 7, further including a remote control having a plurality of manual inputs which permit an operator to transmit signals to the primary stage unit causing the vertical drive unit to raise and lower the wheels, causing the wheels to rotate in a forward direction and a reverse direction, and causing the wheel units to turn, thereby enabling steering of the primary stage unit to a desired location.

9. The primary stage unit of claim 7, wherein each wheel unit is rotatably mounted within the support structure to enable steering of the primary stage unit.

10. The primary stage unit of claim 9, wherein each wheel unit is rotatable independently of the other wheel unit to provide 360 degree steering of the primary stage unit and minimize damage to the surface over which the primary stage unit travels.

11. The primary stage unit of claim 1, wherein the main stage floor is mounted to a lift mechanism housed within a main frame configured to pivot the main stage floor between the stowed position and the in-use position, and raise and lower the main stage floor to the desired height.

12. The primary stage unit of claim 11, wherein the main stage floor includes a forward panel, a rearward panel, and an intermediate panel disposed between the forward panel and the rearward panel, the forward panel telescopically extending away from the rearward panel as the main stage floor pivots from the stowed position to the in-use position.

13. The primary stage unit of claim 11, wherein the main stage floor further includes a plurality of horizontal supports connected at one end to a forward edge beam and pivotally connected at another end to a support truss coupled to the lift mechanism.

14. The primary stage unit of claim 11, further including a remote control including a transmitter configured to transmit signals to the primary stage unit to pivot the main stage floor between the stowed position and the in-use position, to raise and lower the elevation of the main stage floor, and to tilt a forward edge of the main stage floor below a rearward edge of the main stage floor when the main stage floor is in the in-use position.

15. The primary stage unit of claim 14, wherein the lift mechanism is configured to permit tilting of the main stage floor in the in-use position by approximately 30 degrees.

16. The primary stage unit of claim 11, wherein the lift mechanism includes a plurality of support trusses connected to the main stage floor, a lift truss connected to the support trusses, and a plurality of lift uprights mounted to a main frame of the primary stage unit.

17. The primary stage unit of claim 16, wherein each lift upright includes a pair of vertical columns and a hydraulic actuator coupled to a hydraulic control system housed within the primary stage unit, movement of the hydraulic actuator causes movement of the vertical columns, which moves the lift truss, the support trusses, and the main stage floor.

18. The primary stage unit of claim 11, wherein the lift mechanism is configured to support a load of approximately three tons.

19. The primary stage unit of claim 1, wherein the roof assembly support columns are mounted to a main frame of the primary stage unit, each support column including a plurality of telescopically movable nested sections and supporting an extension support structure.

20. The primary stage unit of claim 19, wherein the roof assembly is configured to support a load of approximately three tons.

21. The primary stage unit of claim 19, wherein the extension support structure includes the plurality of roof joists, the roof joists being telescopically movable substantially perpendicular to the support columns between the refracted position and the extended position.

22. The primary stage unit of claim 21, further including a remote control having a plurality of manual inputs which permit an operator to transmit signals to the primary stage unit to retract and extend the support columns and to retract and extend the roof joists.

23. The primary stage unit of claim 21, wherein each support column includes a hydraulic cylinder which drives the movement of the nested sections.

24. The primary stage unit of claim 21, wherein each support column includes a measurement system for synchronizing movement of the support columns.

25. The primary stage unit of claim 1, wherein each roof joist includes a plurality of joist sections that support the corresponding plurality of roof panels such that when roof joists are in the extended position, roof panels adjacent a forward edge of the roof assembly overlap adjacent roof panels disposed nearer to the support columns to permit rain to run toward a rearward edge of the roof assembly without falling onto the main stage floor.

26. The primary stage unit of claim 1, further including a plurality of lighting bars extending between the roof joists adjacent a forward edge of the roof assembly, and a plurality of lights mounted to the lighting bars for illuminating portions of the main stage floor.

27. The primary stage unit of claim 26, wherein at least some of the lights employ LED lighting technology.

28. The primary stage unit of claim 1, further including a hydraulic control system and a generator for powering the hydraulic control system, lighting equipment associated with the primary stage unit, audio equipment associated with the primary stage unit, and video equipment associated with the primary stage unit.

29. The primary stage unit of claim 1, further including a foldable rear screen mounted to the support columns.

30. The primary stage unit of claim 1, further including a video signboard mounted to a forward edge of the roof assembly, the video signboard being configured to provide high resolution textual displays approximately two feet tall.

31. A rapidly deployable primary stage unit configured for transport on a standard semi-trailer, including:
   a remote control including a plurality of buttons;
   a generator;
   a control system powered by the generator;
   a plurality of lateral supports coupled to the control system; and
   a pair of steerable wheel units coupled to the control system;
   wherein actuation of the plurality of buttons causes activation of the generator, movement of the plurality of lateral supports which lifts the primary stage unit off of the trailer, deployment of the wheel units, and enables an operator to steer the primary stage unit to a desired location;
   wherein each wheel unit is mounted within a support structure, and includes a pair of wheel supports each supporting a wheel, and a vertical drive unit that raises and lowers the wheels through an opening in a floor of the support structure.

32. The primary stage unit of claim 31, wherein the primary stage unit, when in a stowed configuration, has a volume that is approximately the same as a volume of a standard cargo container.

33. The primary stage unit of claim 31, further including a local control panel mounted to the primary stage unit including a transmitter configured to transmit signals to the primary stage unit to activate the generator, and actuate the lateral supports to perform self-unloading of the primary stage unit.

34. The primary stage unit of claim 33, wherein the local control panel further includes a level button, activation of which transmits a signal to a controller of the primary stage unit causing the controller to control the lateral supports through an auto-leveling sequence which adjusts the positions of ground-engaging legs of the lateral supports, as necessary, to cause the primary stage unit to assume a substantially level orientation.

35. The primary stage unit of claim 31, wherein actuation of the plurality of buttons permits an operator to transmit signals to the primary stage unit causing the vertical drive unit to raise and lower the wheels, causing the wheels to rotate in a forward direction and a reverse direction, and causing the wheel units to turn, thereby enabling steering of the primary stage unit to the desired location.

36. The primary stage unit of claim 31, further including a main stage floor coupled to a lift mechanism, wherein the remote control includes a transmitter configured to transmit signals to the primary stage unit to cause the lift mechanism to pivot the main stage floor between a substantially vertical stowed position and a substantially horizontal in-use position, and to raise and lower the elevation of the main stage floor when the main stage floor is in the in-use position.

37. The primary stage unit of claim 31, further including a roof assembly having a pair of support columns that support a plurality of roof joists.

38. The primary stage unit of claim 37, wherein each support column includes a plurality of telescopically movable nested sections supporting an extension support structure including the roof joists.

39. The primary stage unit of claim 37, wherein the roof joists support a plurality of roof panels, and are telescopically movable substantially perpendicular to the support columns between a stowed position and the in-use position.

40. The primary stage unit of claim 38, wherein each support column includes a hydraulic cylinder which drives the movement of the nested sections.

41. A method for rapidly deploying a primary stage unit, including the steps of:
   using a remote control to deploy lateral supports of the primary stage unit to engage the ground and lift the primary stage unit off of a trailer;
   using the remote control to deploy and control wheel units mounted to the primary stage unit to move the primary stage unit to a desired location;
   using the remote control to deploy a main stage of the primary stage unit into an in-use position by pivoting and raising the main stage; and
   using the remote control to deploy a roof assembly of the primary stage unit into an in-use position by moving a plurality of roof panels vertically relative to the main stage and telescopically extending the roof panels substantially horizontally relative to the main stage.

42. A rapidly deployable primary stage unit configured for transport on a standard semi-truck trailer, including:
   a telescopically movable roof assembly;
   a pivoting main stage;
   a pair of retractable, steerable wheel units;
   and movable lateral supports having ground-engaging legs;
   the primary stage unit being configured to respond to signals from a remote control by executing a deployment sequence, including
   actuating the lateral supports to engage the ground, thereby lifting the primary stage unit off of the trailer,
   extending the wheel units,
   actuating the lateral supports to lower the primary stage unit onto the wheel units,
   steering the primary stage unit to a desired location,
   pivoting the main stage into a substantially horizontal position, and
   telescopically raising and extending the roof assembly to provide protection for the main stage.

* * * * *